US011580475B2

(12) United States Patent
Retna et al.

(10) Patent No.: US 11,580,475 B2
(45) Date of Patent: Feb. 14, 2023

(54) UTILIZING ARTIFICIAL INTELLIGENCE TO PREDICT RISK AND COMPLIANCE ACTIONABLE INSIGHTS, PREDICT REMEDIATION INCIDENTS, AND ACCELERATE A REMEDIATION PROCESS

(71) Applicant: Accenture Global Solutions Limited, Dublin (IE)

(72) Inventors: San Retna, Lane Cove West (AU); Tushant Nayyar, Ryde (AU); Amit Bansal, Mosman (AU); Rithesh Mohan, Barangaroo (AU); Rimon Nissan, Craigieburn (AU); Jennifer Pham, Collingwood (AU)

(73) Assignee: Accenture Global Solutions Limited, Dublin (IE)

( * ) Notice: Subject to any disclaimer, the term of this patent is extended or adjusted under 35 U.S.C. 154(b) by 39 days.

(21) Appl. No.: 16/720,121

(22) Filed: Dec. 19, 2019

(65) Prior Publication Data
US 2020/0202268 A1 Jun. 25, 2020

Related U.S. Application Data

(60) Provisional application No. 62/782,769, filed on Dec. 20, 2018.

(51) Int. Cl.
*G06Q 10/06* (2012.01)
*G06Q 40/00* (2012.01)
(Continued)

(52) U.S. Cl.
CPC ......... *G06Q 10/0635* (2013.01); *G06N 20/00* (2019.01); *G06Q 30/016* (2013.01); *G06Q 40/125* (2013.12)

(58) Field of Classification Search
CPC .......... G06Q 10/0635; G06Q 10/0637; G06Q 10/06375; G06Q 40/125; G06Q 30/016; G06Q 10/067; G06N 20/00
See application file for complete search history.

(56) References Cited

U.S. PATENT DOCUMENTS 9,600,779 B2 * 3/2017 Hoover ................. G06F 3/0481
9,679,261 B1   6/2017 Hoover et al.
(Continued)

FOREIGN PATENT DOCUMENTS

WO   WO-2007005975 A2 *  1/2007   ............. G06N 5/022

OTHER PUBLICATIONS

Bose, Indranil, and Radha K. Mahapatra. "Business data mining—a machine learning perspective." Information & management 39.3 (2001): 211-225. (Year: 2001).*

*Primary Examiner* — Mehmet Yesildag
*Assistant Examiner* — Thomas Yih Ho
(74) *Attorney, Agent, or Firm* — Harrity & Harrity, LLP

(57) ABSTRACT

A device may receive historical risk data identifying historical risks associated with entities, and historical compliance data identifying historical compliance actions performed by the entities. The device may train a machine learning model with the historical risk data and the historical compliance data to generate a structured semantic model, and may receive entity risk data identifying new and existing risks associated with an entity. The device may receive entity compliance data identifying new and existing compliance actions performed by the entity, and may process the entity risk data and the entity compliance data, with the structured semantic model, to determine risk and compliance insights for the entity. The risk and compliance insights may include insights associated with a key performance indicator, a compliance issue, a regulatory issue, an operational risk, a compliance risk, or a qualification of controls.

(Continued)

100 ⟶

Server device

105
Receive, from a data source, historical risk data identifying historical risks, and historical compliance data identifying historical compliance actions ⟶

Intelligence platform

The device may perform actions based on the risk and compliance insights.

20 Claims, 24 Drawing Sheets

(51) Int. Cl.
   *G06Q 30/00*    (2012.01)
   *G06N 20/00*    (2019.01)
   *G06Q 10/0635*  (2023.01)
   *G06Q 40/12*    (2023.01)
   *G06Q 30/016*   (2023.01)

(56) References Cited

U.S. PATENT DOCUMENTS

| | | | |
|---|---|---|---|
| 9,830,316 B2 | 11/2017 | Eisen | |
| 10,157,396 B1* | 12/2018 | Phillips | G06Q 30/0205 |
| 10,410,142 B1* | 9/2019 | Hess | G06Q 10/0635 |
| 2005/0065807 A1* | 3/2005 | DeAngelis | G06Q 10/0635 |
| | | | 705/7.28 |
| 2005/0075921 A1* | 4/2005 | Hayes-Roth | G06Q 10/06 |
| | | | 705/7.26 |
| 2005/0228685 A1* | 10/2005 | Schuster | G06Q 10/0639 |
| | | | 705/317 |
| 2006/0047561 A1* | 3/2006 | Bolton | G06F 21/577 |
| | | | 705/7.28 |
| 2008/0208786 A1* | 8/2008 | Serrano-Morales | G06N 5/025 |
| | | | 706/47 |
| 2008/0262895 A1* | 10/2008 | Hofmeister | G06Q 10/06393 |
| | | | 705/7.17 |
| 2009/0157446 A1* | 6/2009 | McCreary | G06Q 10/0635 |
| | | | 705/7.28 |
| 2011/0131076 A1* | 6/2011 | Leidner | G06Q 10/0635 |
| | | | 705/7.28 |
| 2011/0270770 A1* | 11/2011 | Cunningham | G06Q 10/10 |
| | | | 705/304 |
| 2014/0156568 A1* | 6/2014 | Ganguly | G06Q 10/0637 |
| | | | 706/12 |
| 2014/0249872 A1* | 9/2014 | Stephan | G06Q 10/063 |
| | | | 705/7.11 |
| 2014/0279307 A1* | 9/2014 | Kuster | G06Q 40/12 |
| | | | 705/30 |
| 2015/0073859 A1* | 3/2015 | Bagheri | G06Q 10/10 |
| | | | 705/7.28 |
| 2015/0088783 A1* | 3/2015 | Mun | G06Q 40/06 |
| | | | 705/36 R |
| 2015/0178638 A1 | 6/2015 | Deshpande et al. | |
| 2015/0339604 A1* | 11/2015 | Alikhan | G06Q 10/0635 |
| | | | 705/7.28 |
| 2015/0371163 A1* | 12/2015 | Noh | G06Q 10/0635 |
| | | | 705/7.28 |
| 2017/0109671 A1* | 4/2017 | Nagaraja Rao | G06Q 10/0635 |
| 2017/0132578 A1* | 5/2017 | Merg | G06F 16/285 |
| 2017/0308836 A1* | 10/2017 | Kass | G06N 20/00 |
| 2017/0352105 A1* | 12/2017 | Billings | G06Q 40/08 |
| 2018/0053128 A1* | 2/2018 | Costas | G06Q 50/18 |
| 2018/0255470 A1* | 9/2018 | Zhang | H04L 41/147 |
| 2018/0315141 A1* | 11/2018 | Hunn | G06F 16/901 |
| 2019/0156256 A1* | 5/2019 | Argyros | G06F 40/30 |
| 2019/0220937 A1* | 7/2019 | Brestoff | G06Q 50/18 |
| 2019/0311374 A1* | 10/2019 | Dai | G06F 40/279 |

* cited by examiner

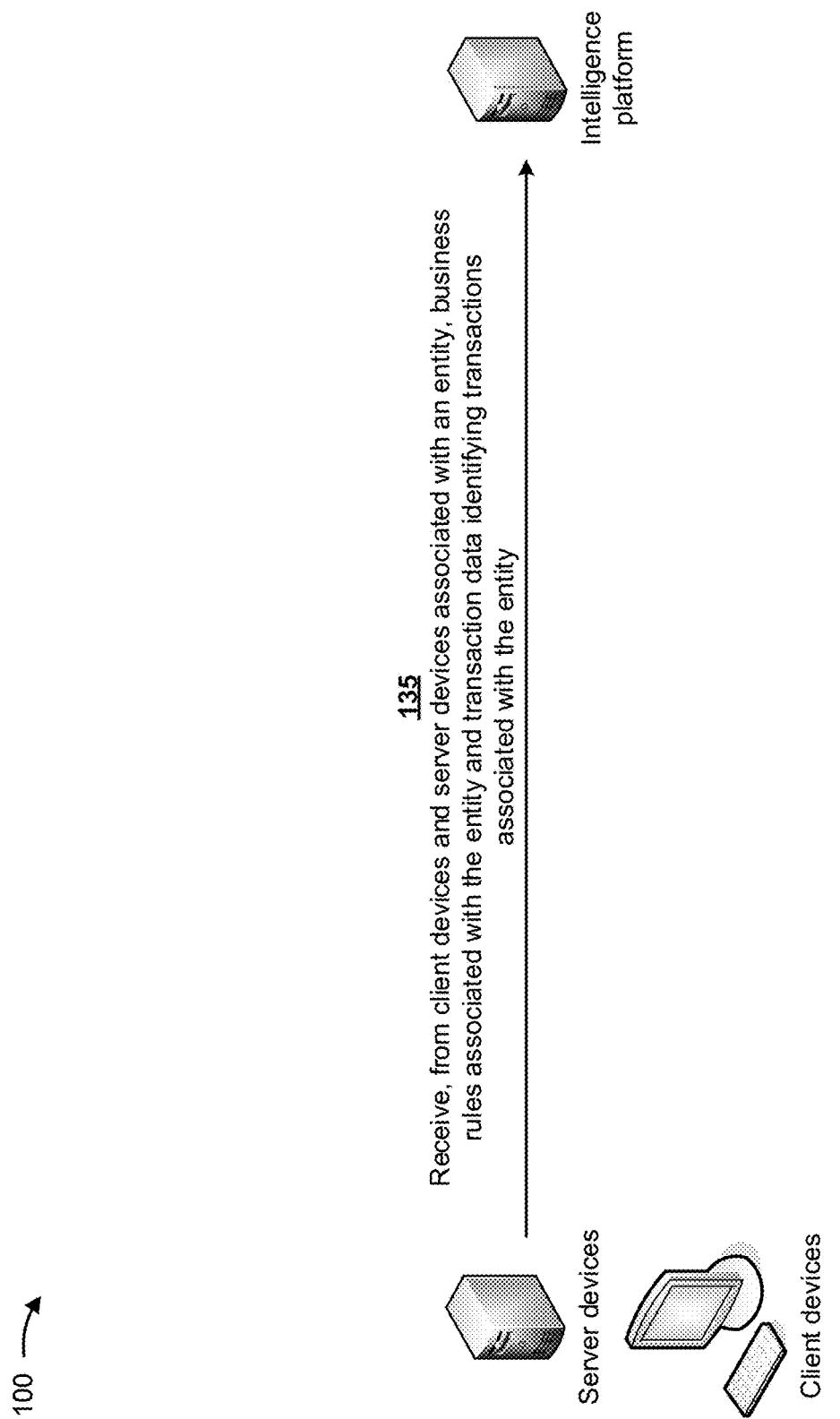

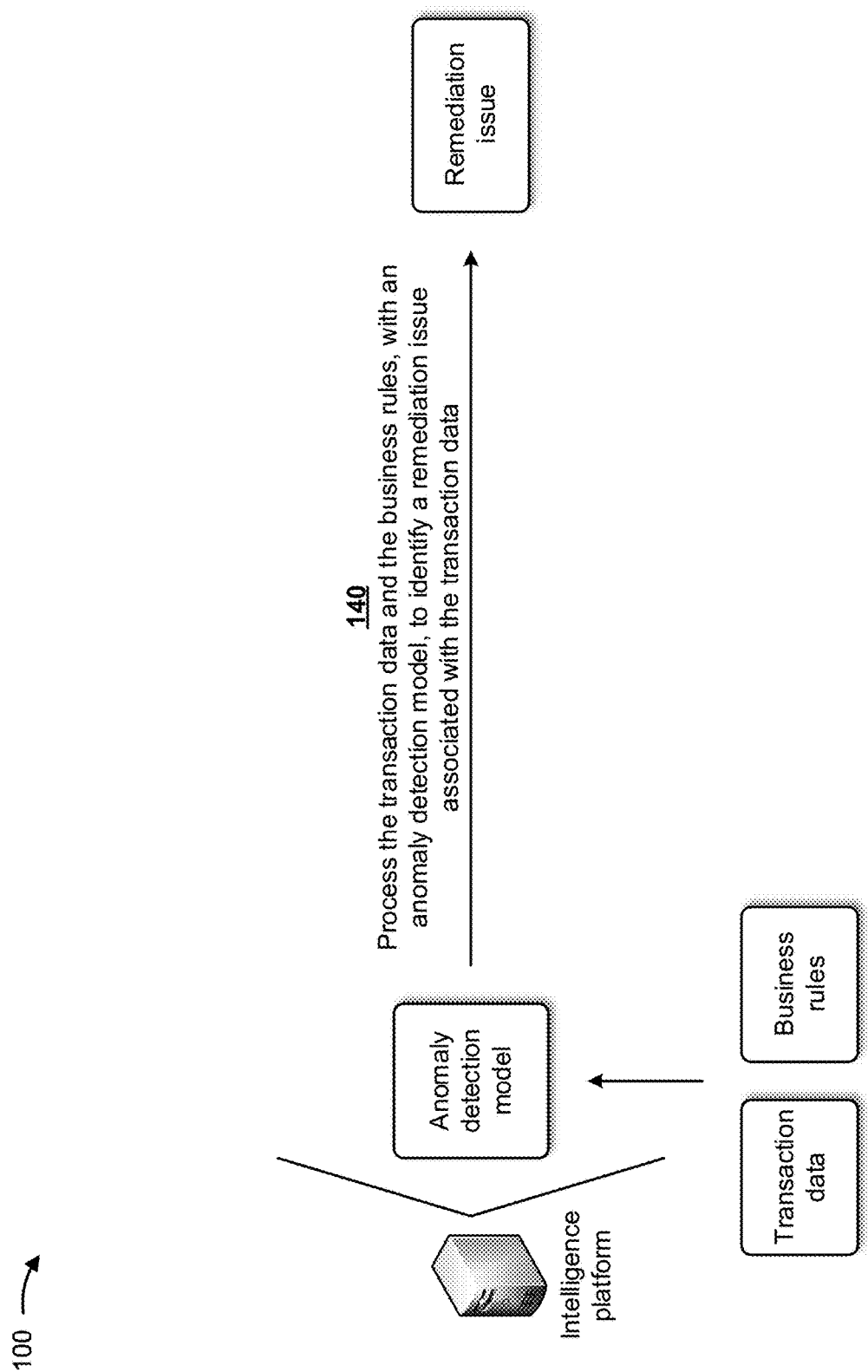

UTILIZING ARTIFICIAL INTELLIGENCE TO PREDICT RISK AND COMPLIANCE ACTIONABLE INSIGHTS, PREDICT REMEDIATION INCIDENTS, AND ACCELERATE A REMEDIATION PROCESS

RELATED APPLICATION

This application claims priority to U.S. Provisional Patent Application No. 62/782,769, filed on Dec. 20, 2018, and entitled "UTILIZING MACHINE LEARNING AND STRUCTURED SEMANTIC MODELS TO PREDICT RISK AND COMPLIANCE INFORMATION," the content of which is incorporated by reference herein in its entirety.

BACKGROUND

Governance, risk management, and compliance (GRC) refer to an entity's coordinated strategy for managing the issues of corporate governance, enterprise risk management (ERM), and corporate compliance with regard to government regulatory requirements. These issues may be handled via activities conducted by corporate departments such as internal auditing, compliance, risk, legal, finance, information technology, human resources, and/or the like. Furthermore, as regulations and requests from government regulators increase, workloads for corporate employees also increase, which may lead to unaligned regulation reporting practices by the corporation.

Entities are experiencing increased costs for compliance with regulations (e.g., environmental regulations, financial regulations, and/or the like), and must continually adapt to maintain compliance with new regulations. Regulatory enforcement actions or findings often require entities to implement wide-ranging remedial programs (e.g., perform remediation) or changes to business practices. Current remediation techniques require performance of manually intensive and time consuming steps, which results in low turn-around times, delayed response, poor customer satisfaction, high costs, and/or the like. Thus, entities are faced with increased costs associated with risk and compliance, which, in turn, increases costs associated with remediation.

SUMMARY

According to some implementations, a method may include receiving historical risk data identifying historical risks associated with entities, and receiving historical compliance data identifying historical compliance actions performed by the entities. The method may include training a machine learning model with the historical risk data and the historical compliance data to generate a structured semantic model, and receiving entity risk data identifying new and existing risks associated with an entity. The method may include receiving entity compliance data identifying new and existing compliance actions performed by the entity, and processing the entity risk data and the entity compliance data, with the structured semantic model, to determine risk and compliance insights for the entity. The risk and compliance insights may include one or more of an insight associated with a key performance indicator, an insight associated with a compliance issue, an insight associated with a regulatory issue, an insight associated with an operational risk, an insight associated with a compliance risk, or an insight associated with a qualification of controls. The method may include performing one or more actions based on the risk and compliance insights for the entity.

According to some implementations, a device may include one or more memories, and one or more processors to receive business rules associated with an entity, and receive transaction data identifying transactions associated with the entity. The one or more processors may process the business rules and the transaction data, with an anomaly detection model, to identify a remediation issue associated with the transaction data, and may process data identifying the remediation issue, with a customer identifier model, to identify customers affected by the remediation issue. The one or more processors may process data identifying the remediation issue and the customers, with a remediation solution model, to determine a remediation solution for the remediation issue, and may cause the remediation solution to be implemented for the customers.

According to some implementations, a non-transitory computer-readable medium may store one or more instructions that, when executed by one or more processors of a device, may cause the one or more processors to receive historical remediation incidents data identifying historical remediation incidents associated with entities, and group the historical remediation incidents data into remediation incidents categories based on remediation themes and subjects. The one or more instructions may cause the one or more processors to map complaints data identifying complaints associated with the entities, with the remediation incidents categories, to generate training data, and train a prediction model with the training data to generate a trained prediction model. The one or more instructions may cause the one or more processors to process a new complaint associated with an entity, with the trained prediction model, to predict a remediation incident for the new complaint and a category for the remediation incident, and perform one or more actions based on the remediation incident and the category for the remediation incident.

DETAILED DESCRIPTION

Figure 1A:
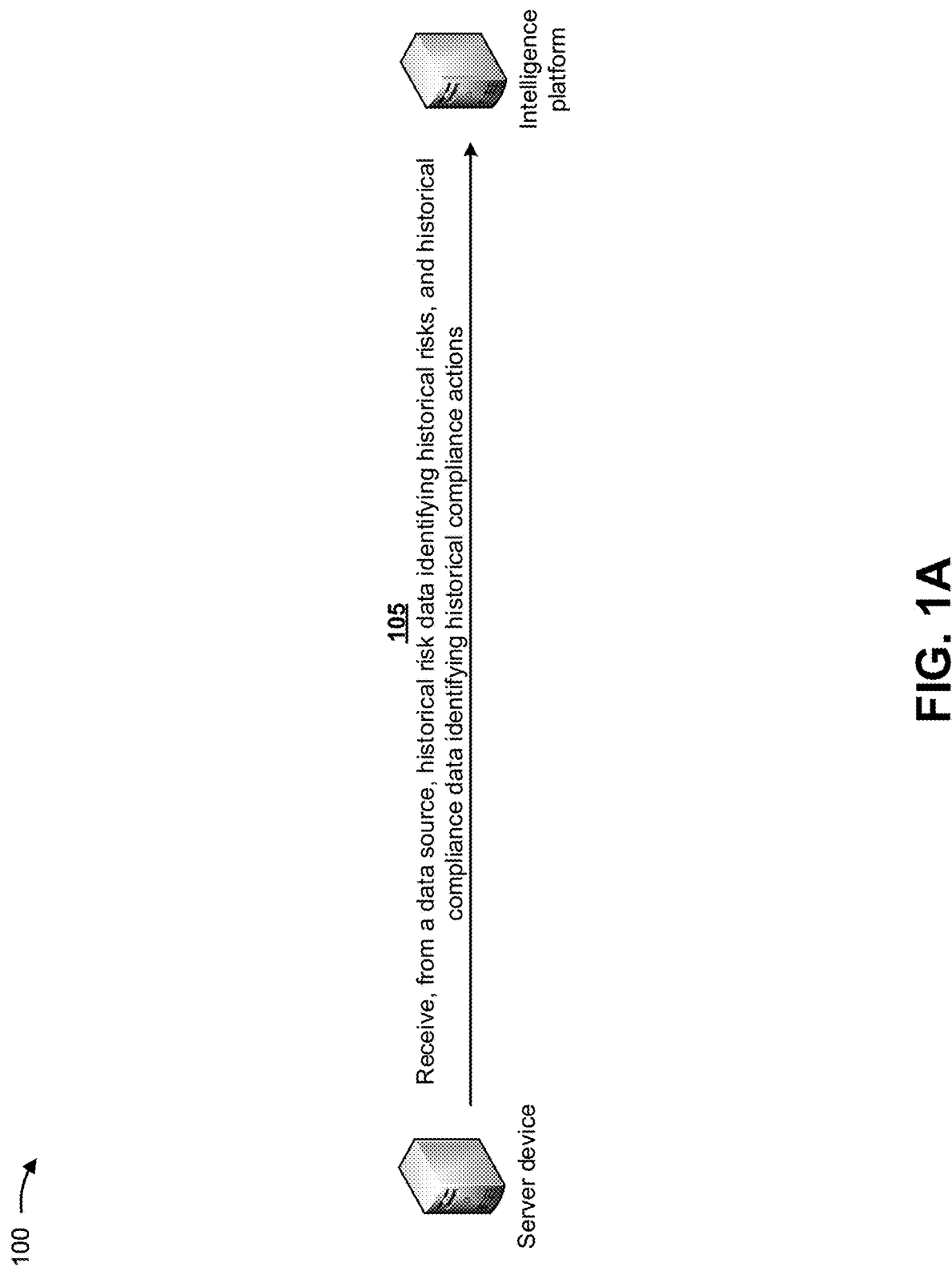
FIGS. 1A-1S are diagrams of one or more example implementations described herein.

The following detailed description of example implementations refers to the accompanying drawings. The same reference numbers in different drawings may identify the same or similar elements.

Outdated information technology systems fail to satisfy integrated and granular regulatory reporting demands of a corporation in an economic way. Corporations have made substantial investments in systems that support making effective compliance and risk decisions. However, the systems are typically separate and provide vast amounts of separate information that is nearly impossible to correlate, interpret, and act upon. Furthermore, the systems fail to provide support for current manual remediation techniques. Thus, current systems and techniques waste computing resources (e.g., processing resources, memory resources, communication resources, and/or the like), networking resources, human resources, and/or the like associated with providing poor risk and compliance, making misinformed decisions regarding risk and compliance, inefficiently performing remediation, performing incorrect remediation due to misinformed decisions regarding risk and compliance, and/or like.

Some implementations described herein provide an intelligence platform that utilizes machine learning models to predict risk and compliance data, remediation incidents, and remediation solutions. For example, the intelligence platform may receive historical risk data identifying historical risks associated with entities, and may receive historical compliance data identifying historical compliance actions performed by the entities. The intelligence platform may train a machine learning model with the historical risk data and the historical compliance data to generate a structured semantic model, and may receive entity risk data identifying new and existing risks associated with an entity. The intelligence platform may receive entity compliance data identifying new and existing compliance actions performed by the entity, and may process the entity risk data and the entity compliance data, with the structured semantic model, to determine risk and compliance insights for the entity. The risk and compliance insights may include one or more of an insight associated with a key performance indicator, an insight associated with a compliance issue, an insight associated with a regulatory issue, an insight associated with an operational risk, an insight associated with a compliance risk, or an insight associated with a qualification of controls. The intelligence platform may perform one or more actions based on the risk and compliance insights for the entity.

In this way, the intelligence platform automatically predicts risk and compliance data, remediation incidents, and remediation solutions based on machine learning models. This, in turn, conserves computing resources, networking resources, human resources, and/or the like that would otherwise be wasted in providing poor risk and compliance, making misinformed decisions regarding risk and compliance, inefficiently performing remediation, performing incorrect remediation due to misinformed decisions regarding risk and compliance, and/or like.

Figure 1B:
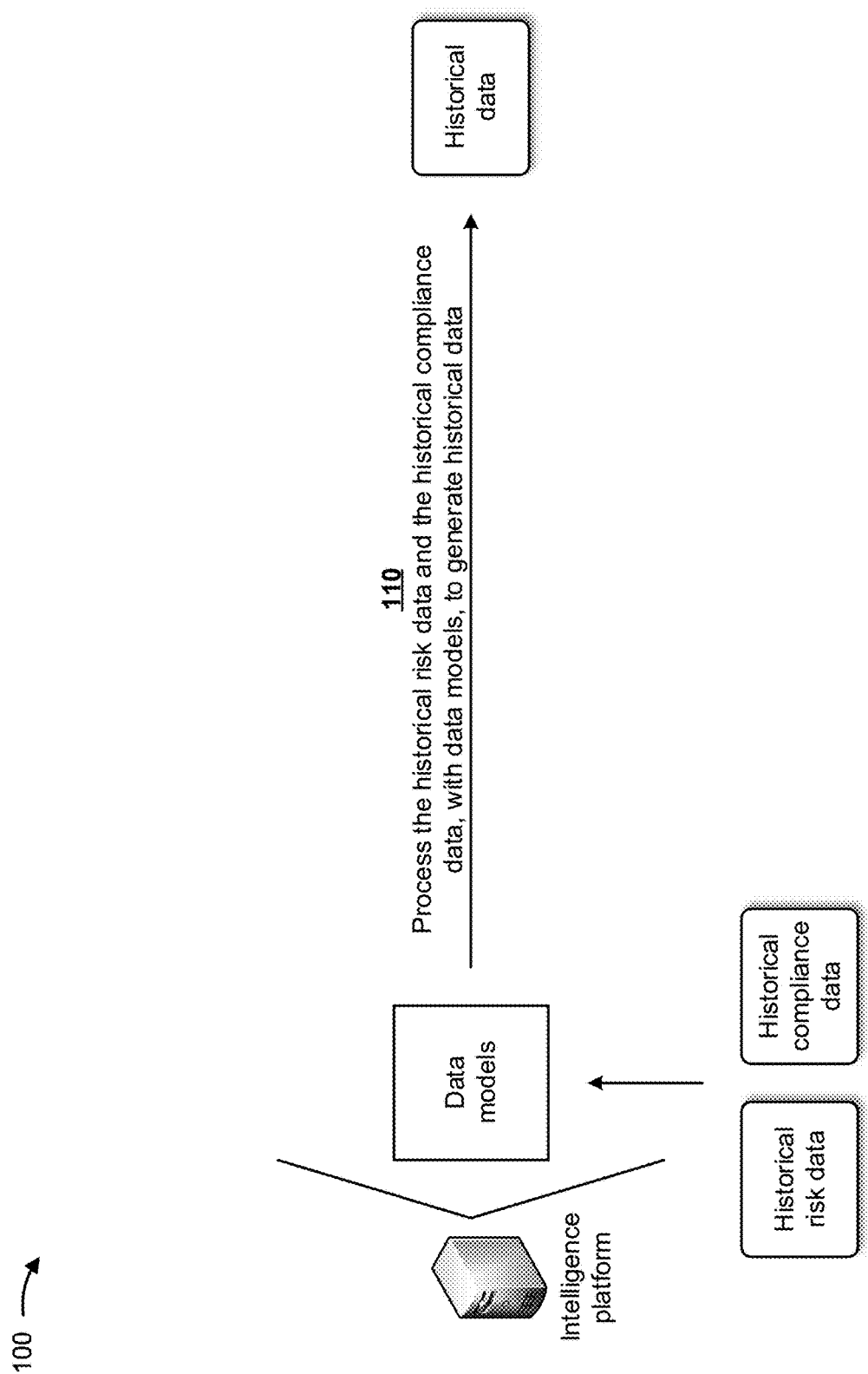
Figure 1C:
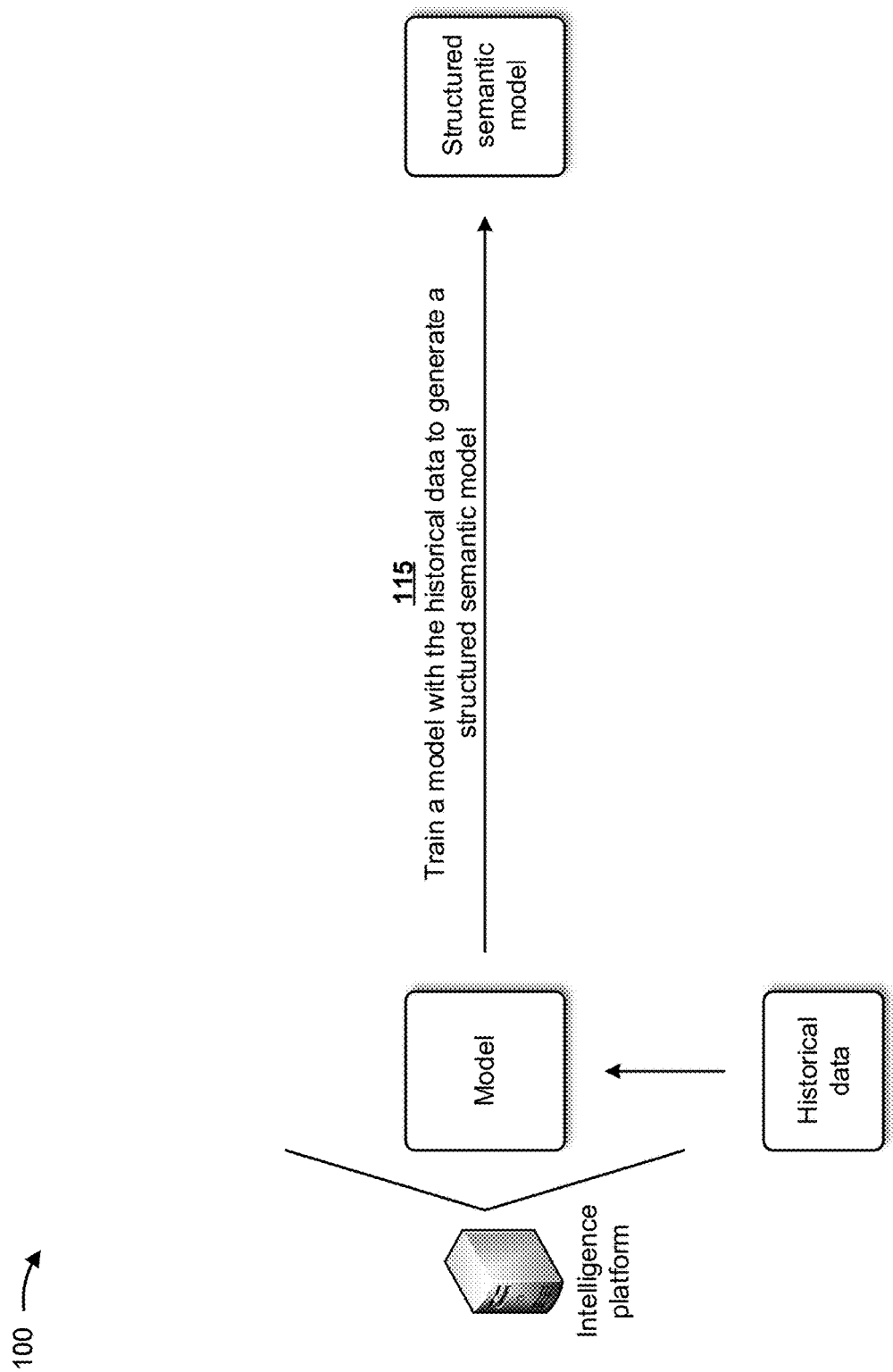
Figure 1D:
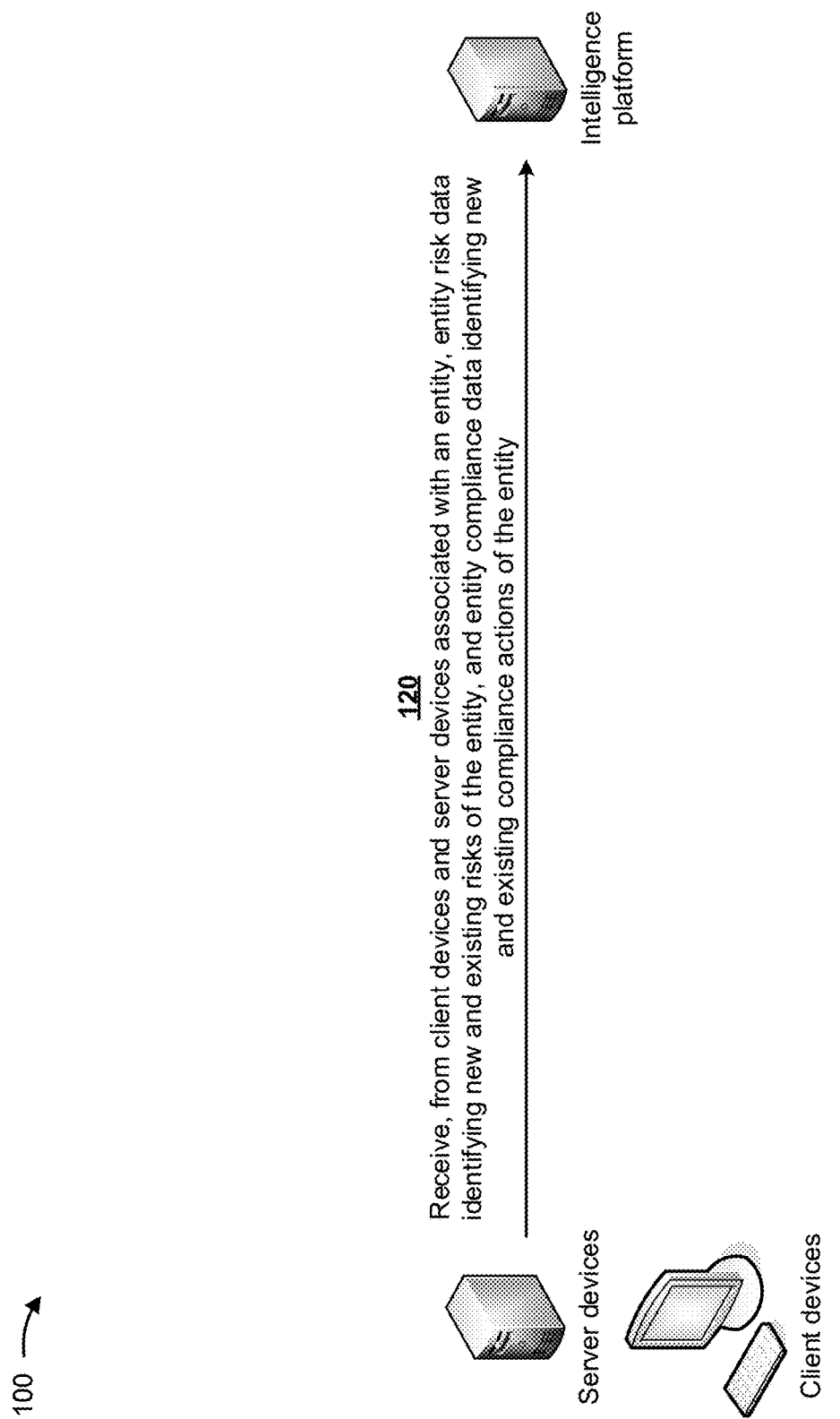
Figure 1E:
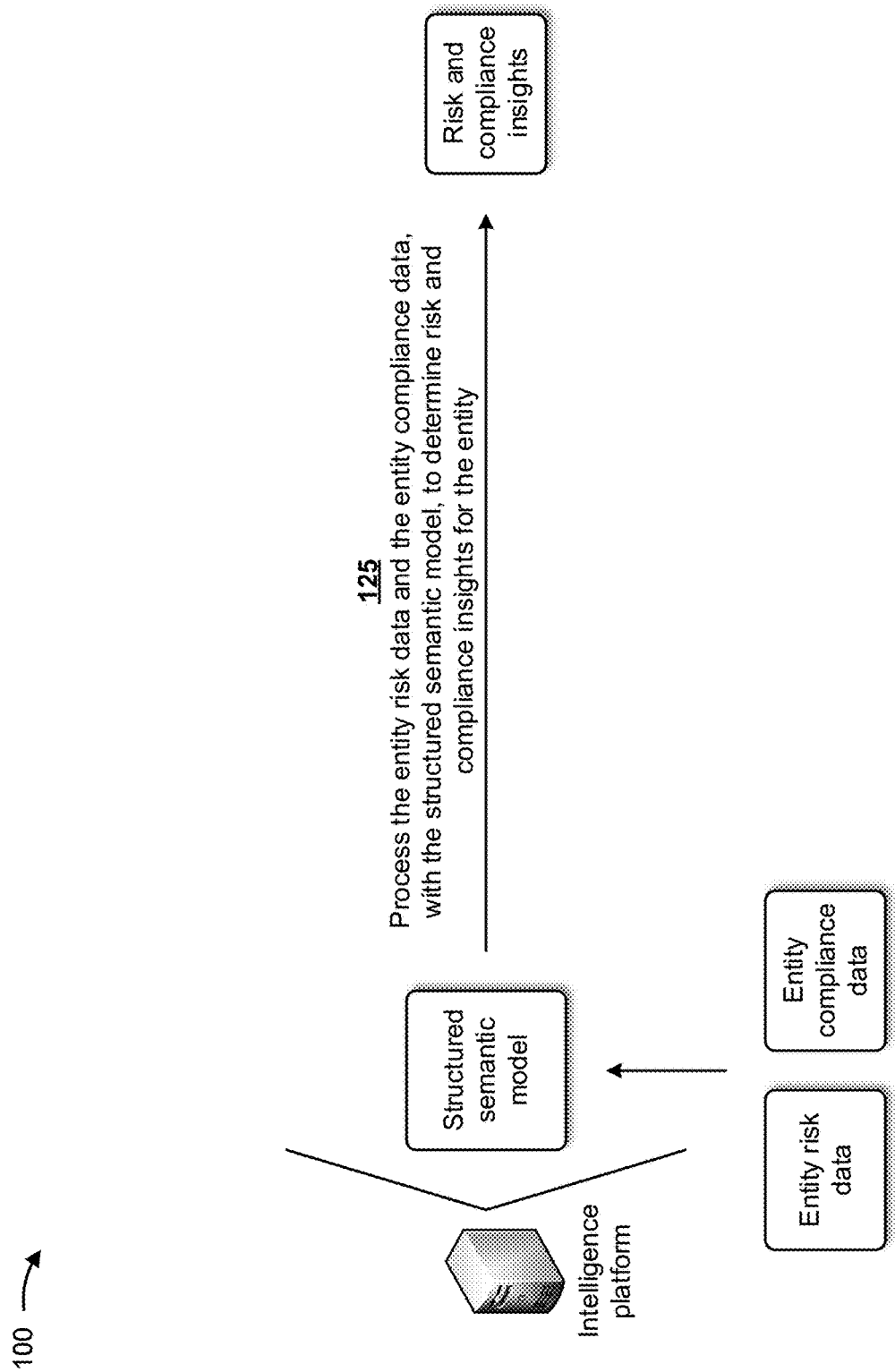
Figure 1F:
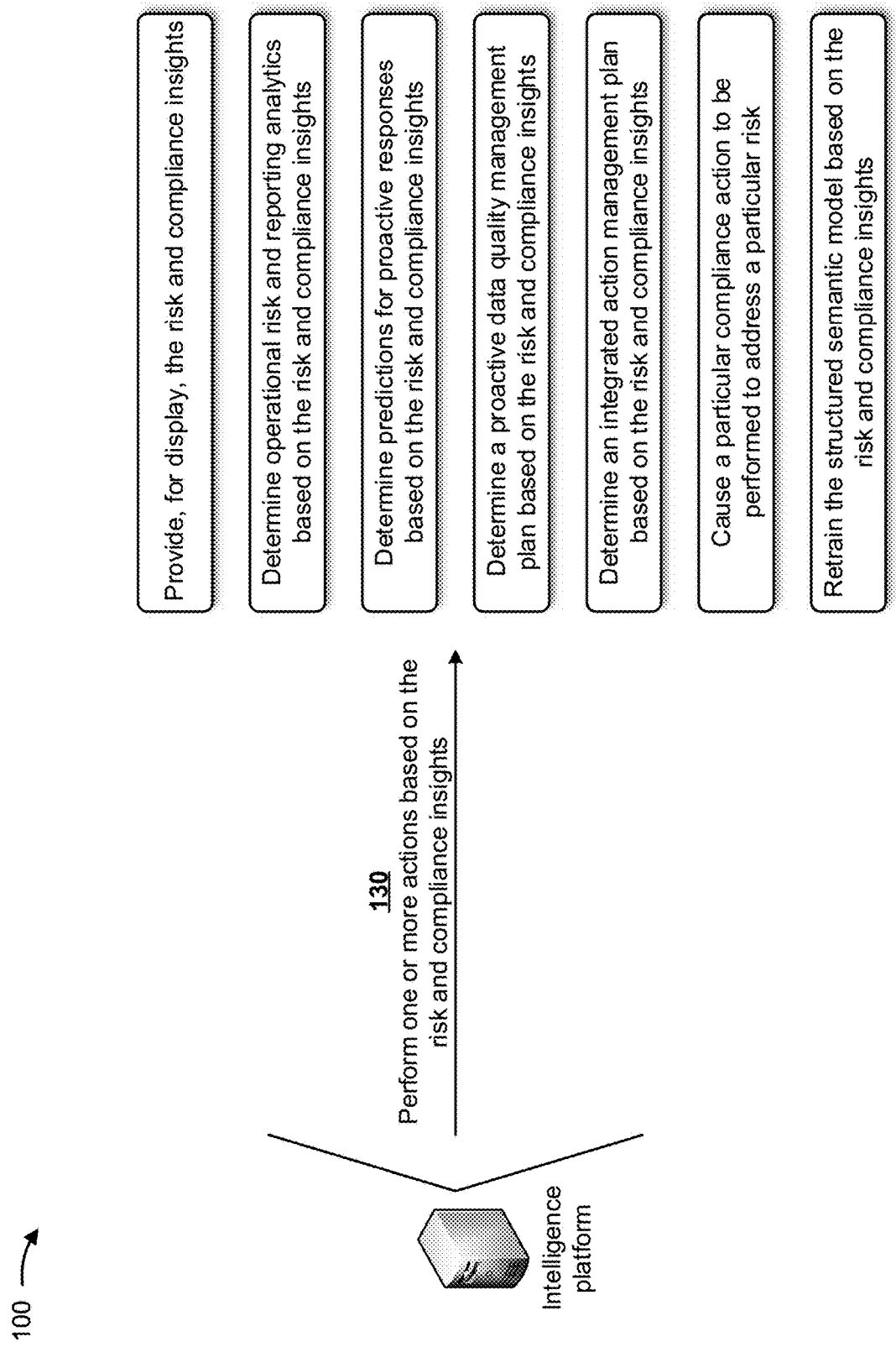
Figure 1I:
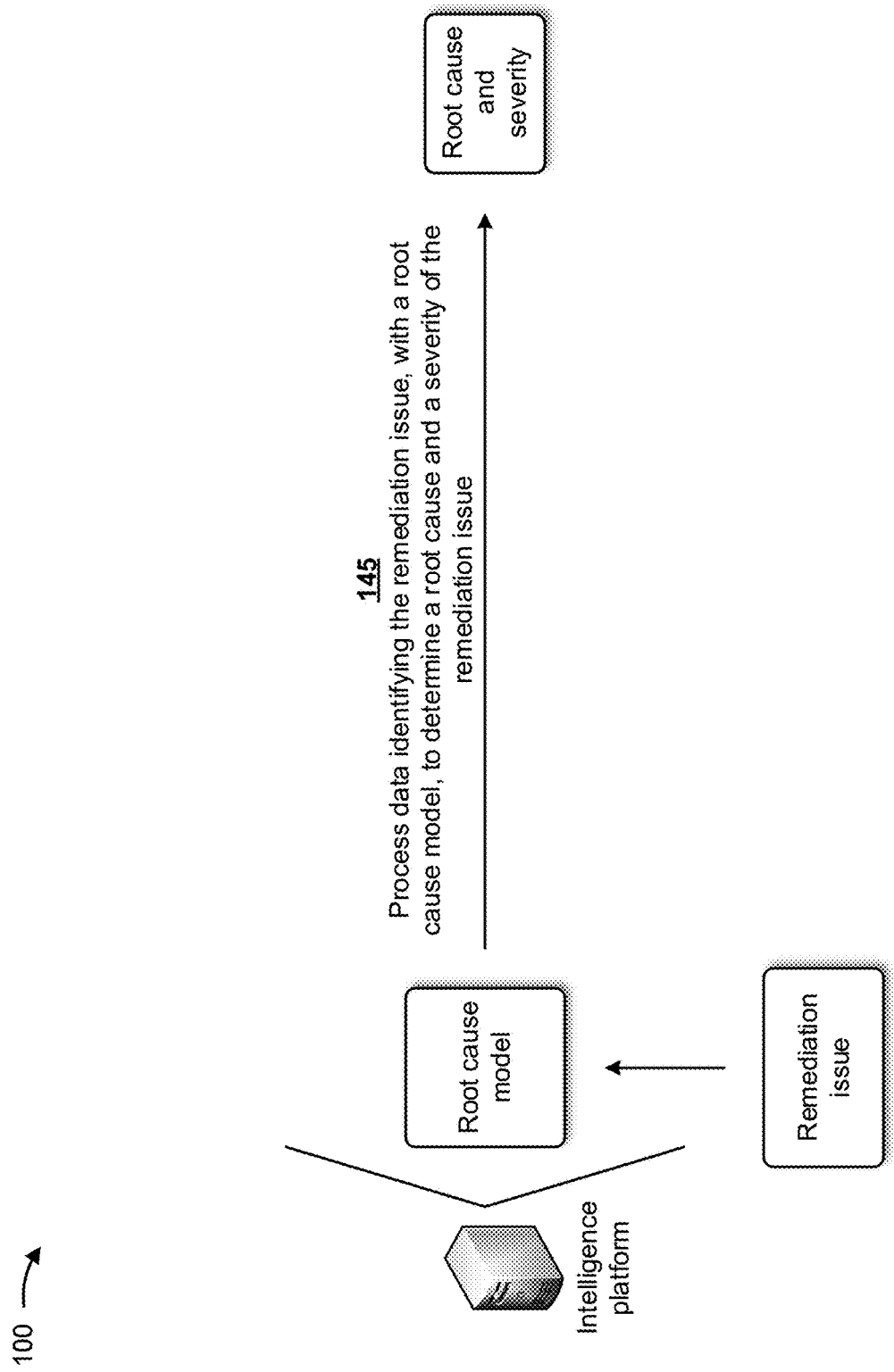
Figure 1J:
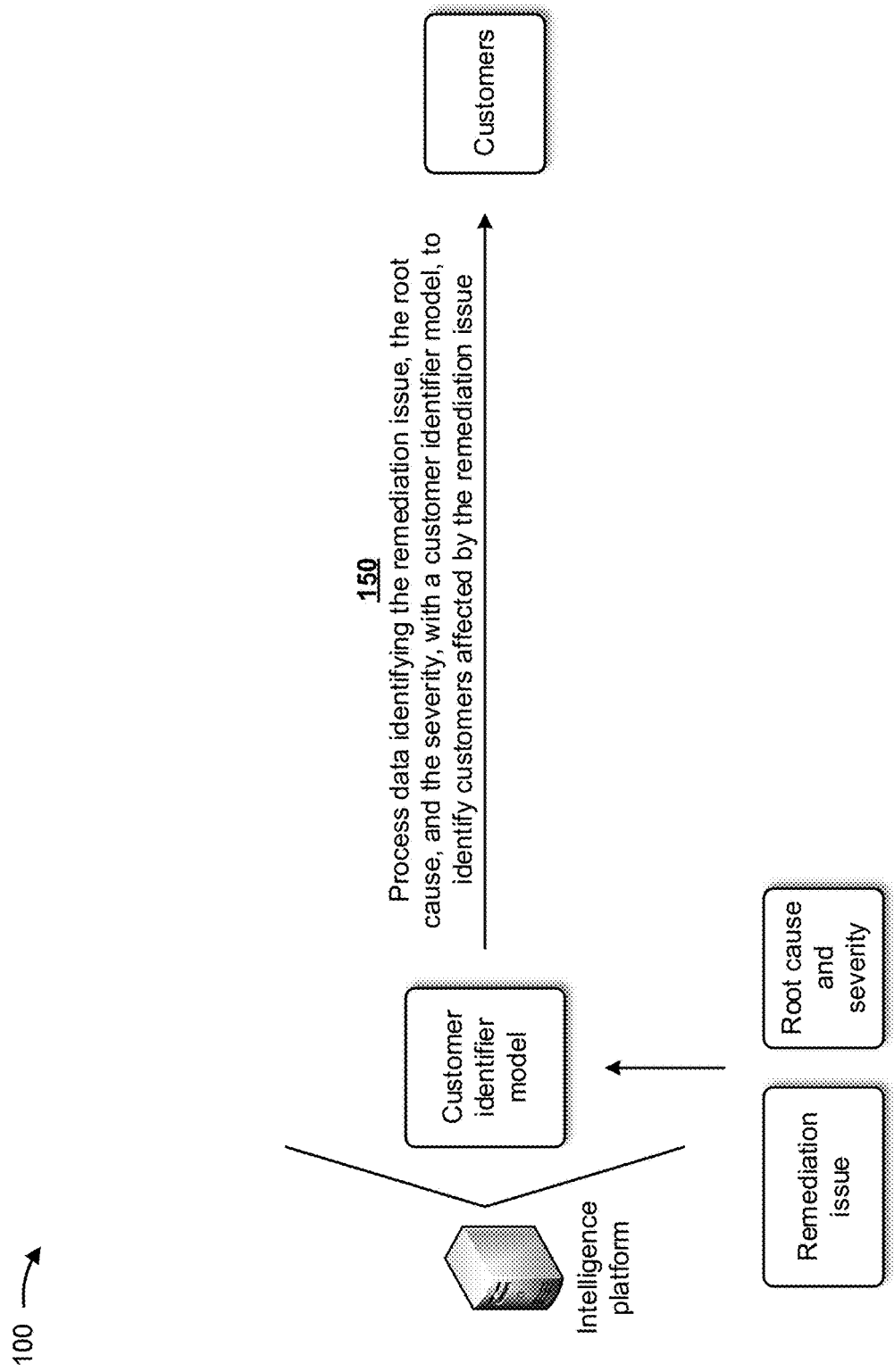
Figure 1K:
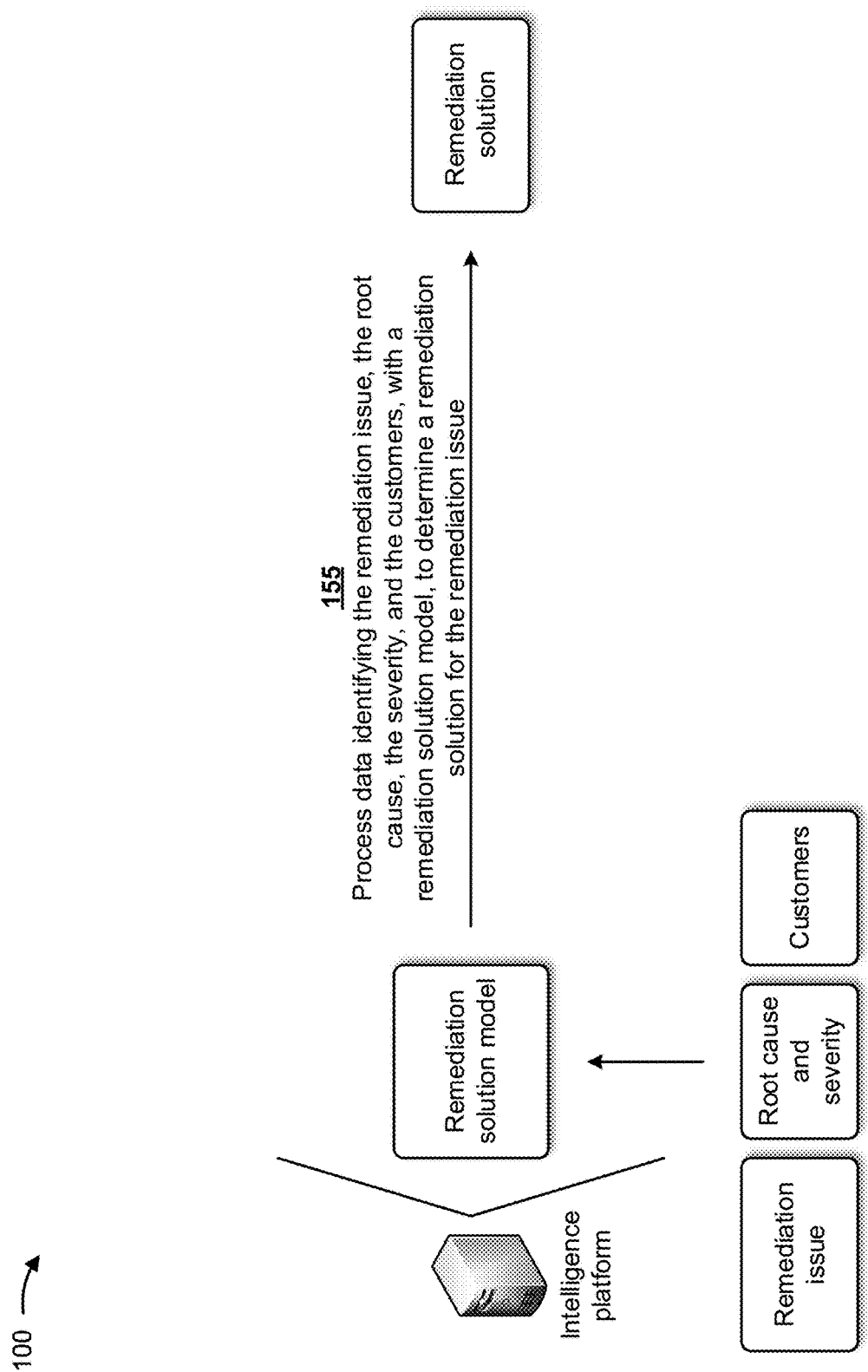
Figure 1L:
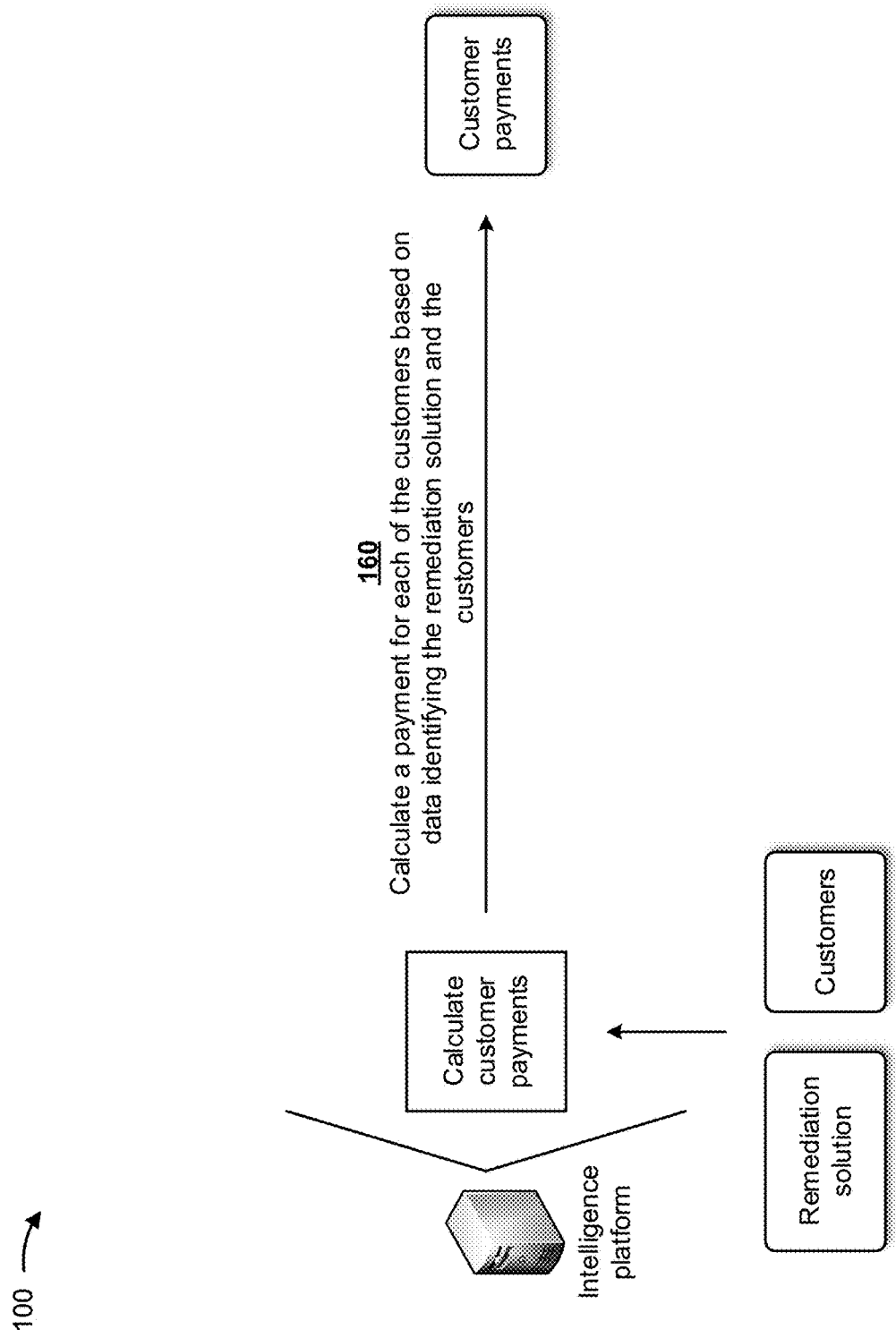
Figure 1M:
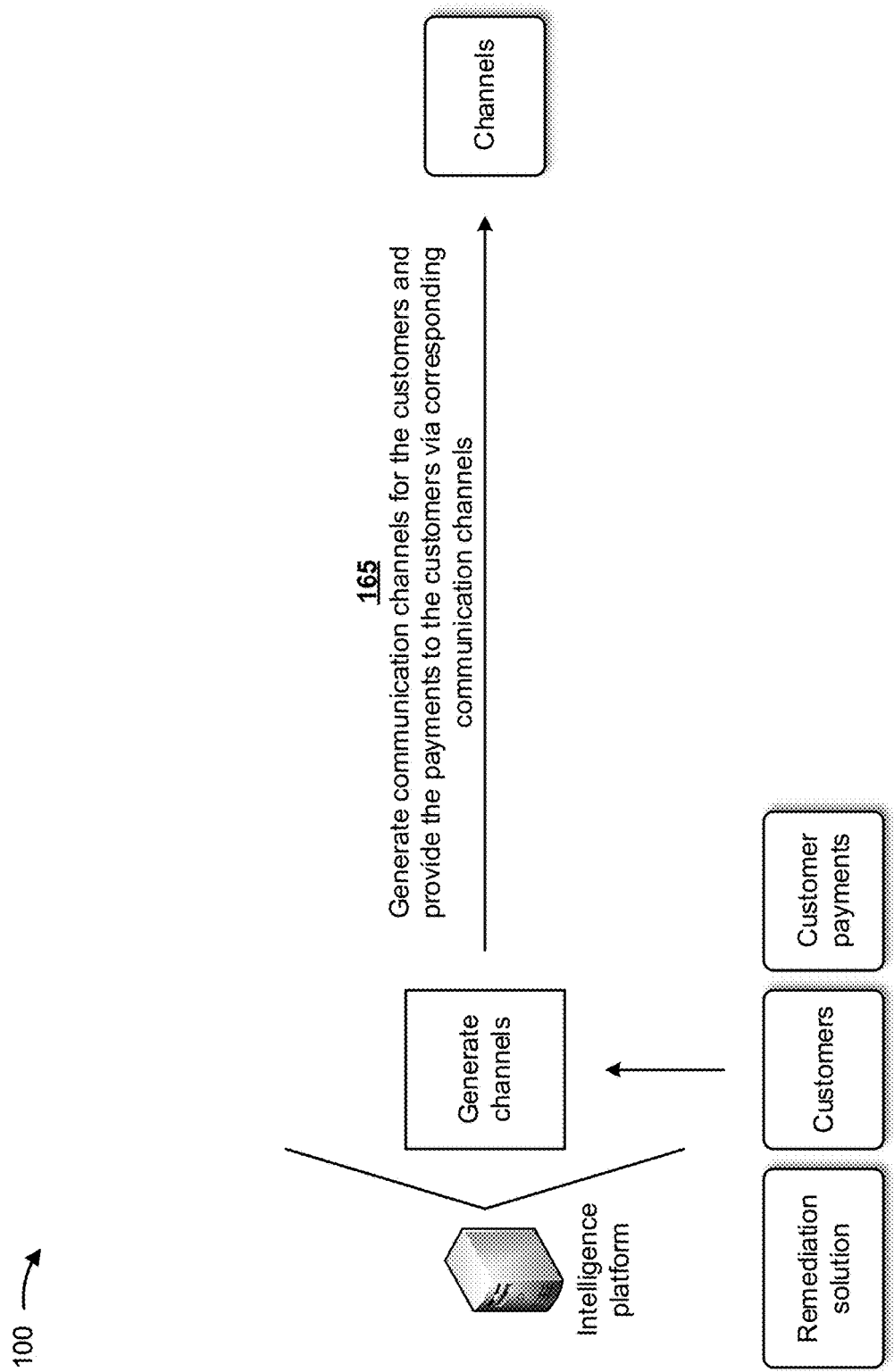
Figure 1N:
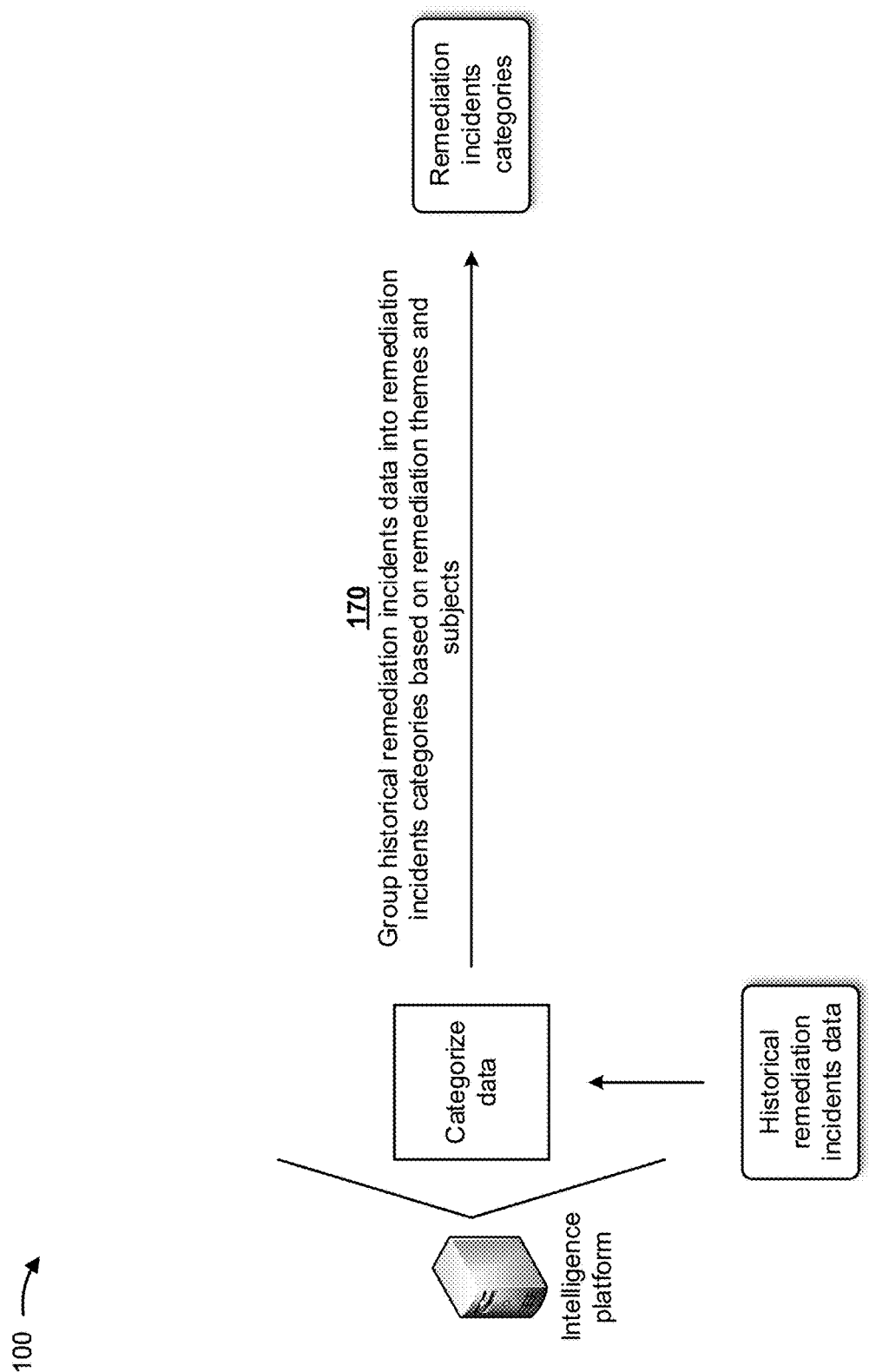
Figure 10:
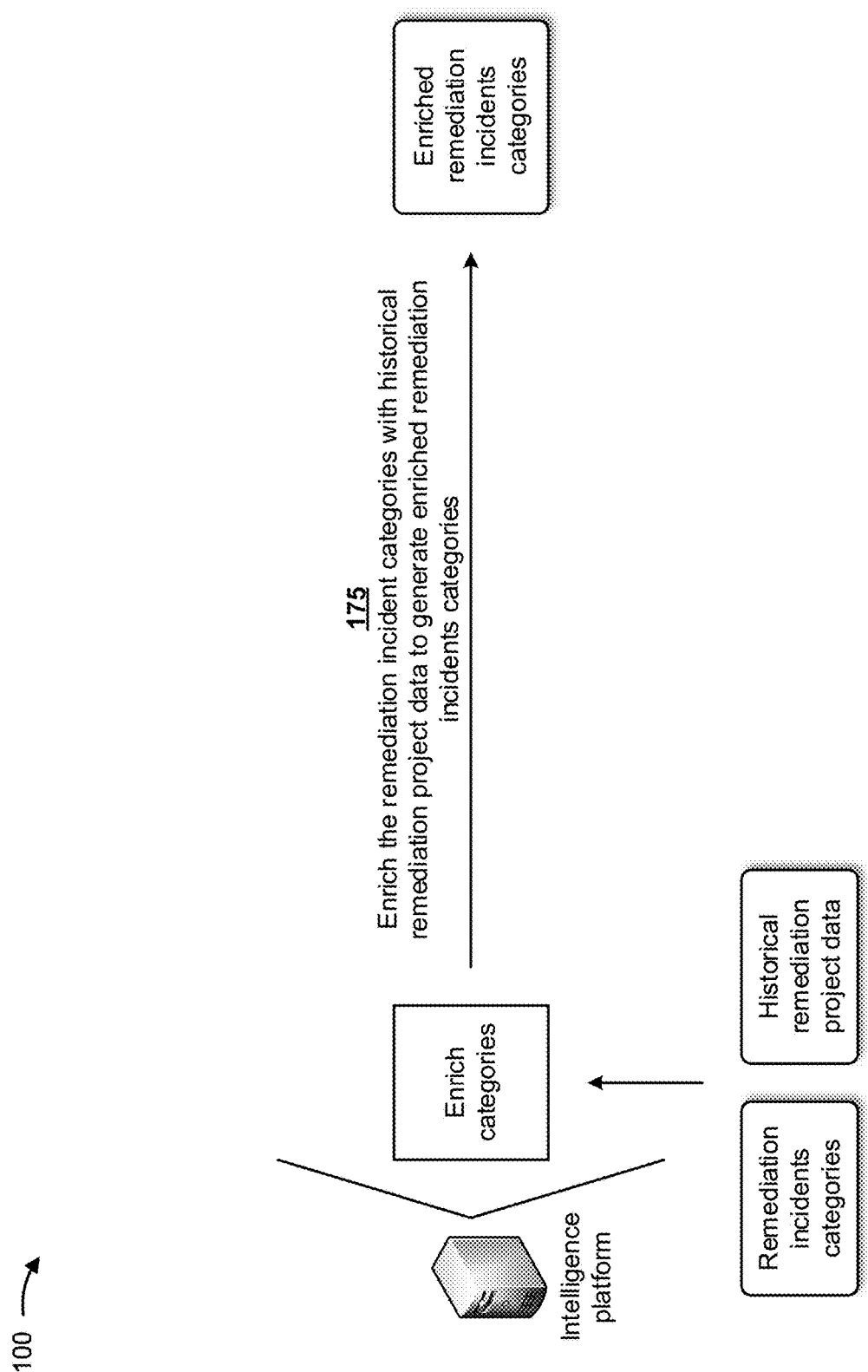
Figure 1P:
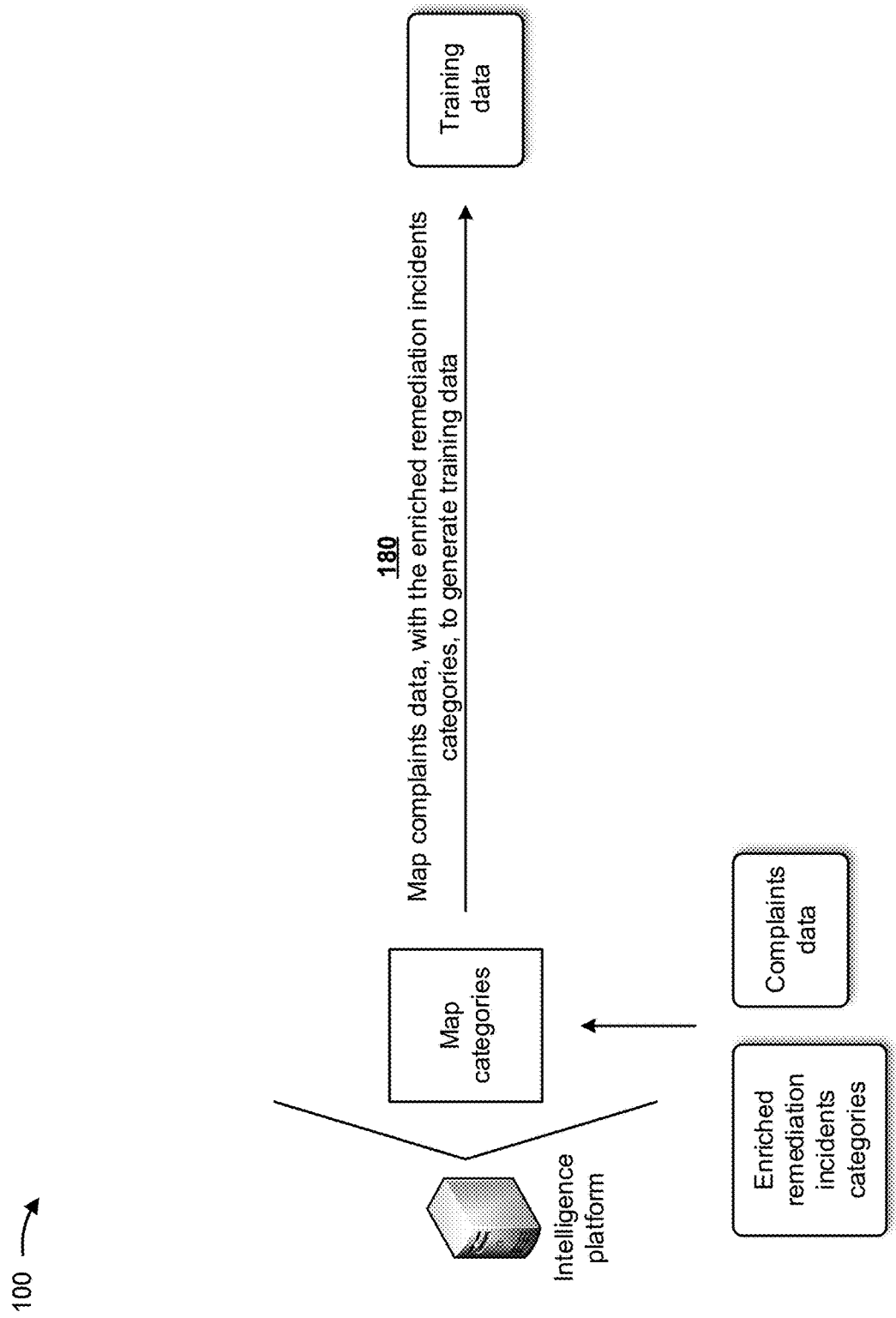
Figure 1Q:
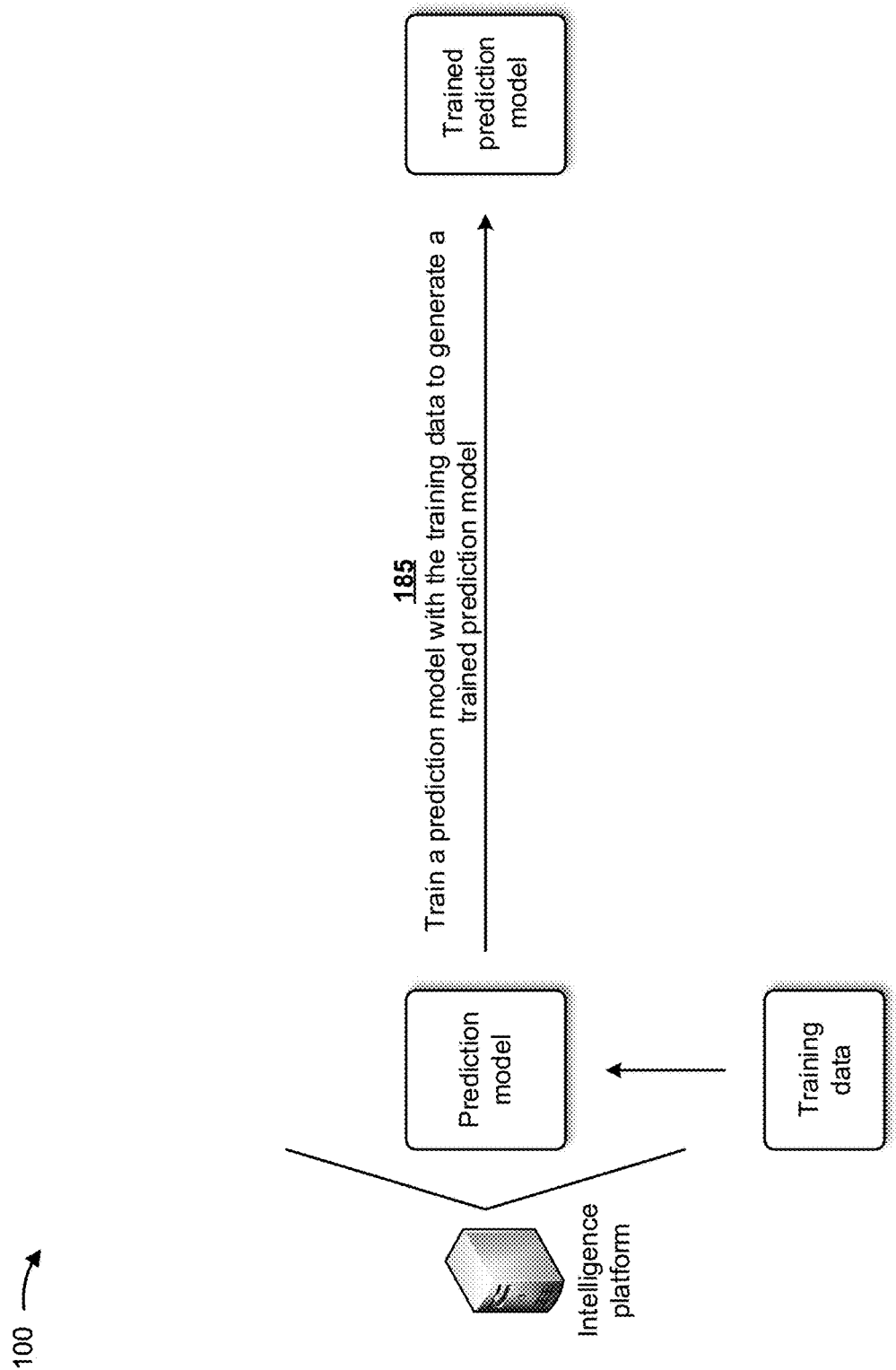
Figure 1R:
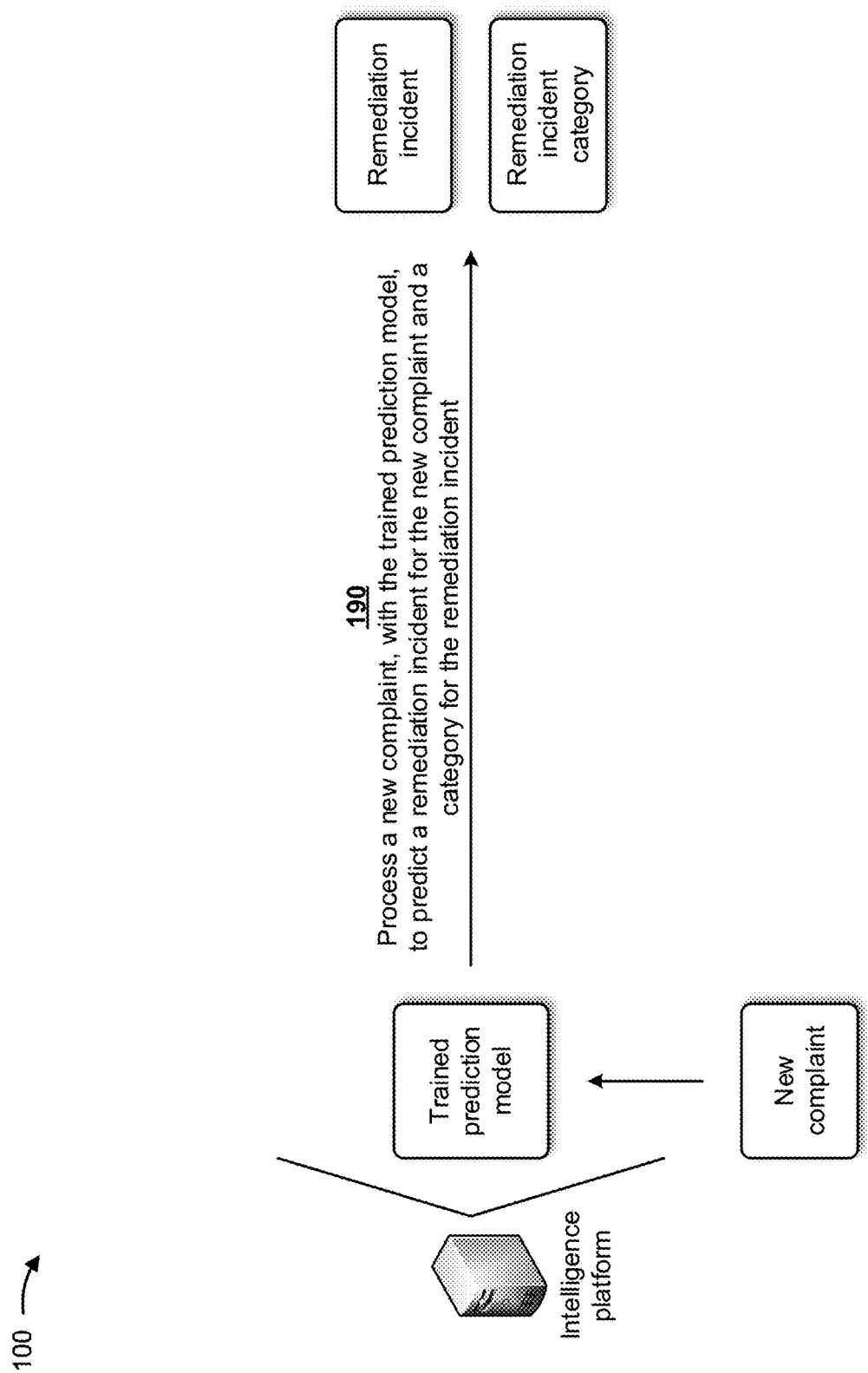
Figure 1S:
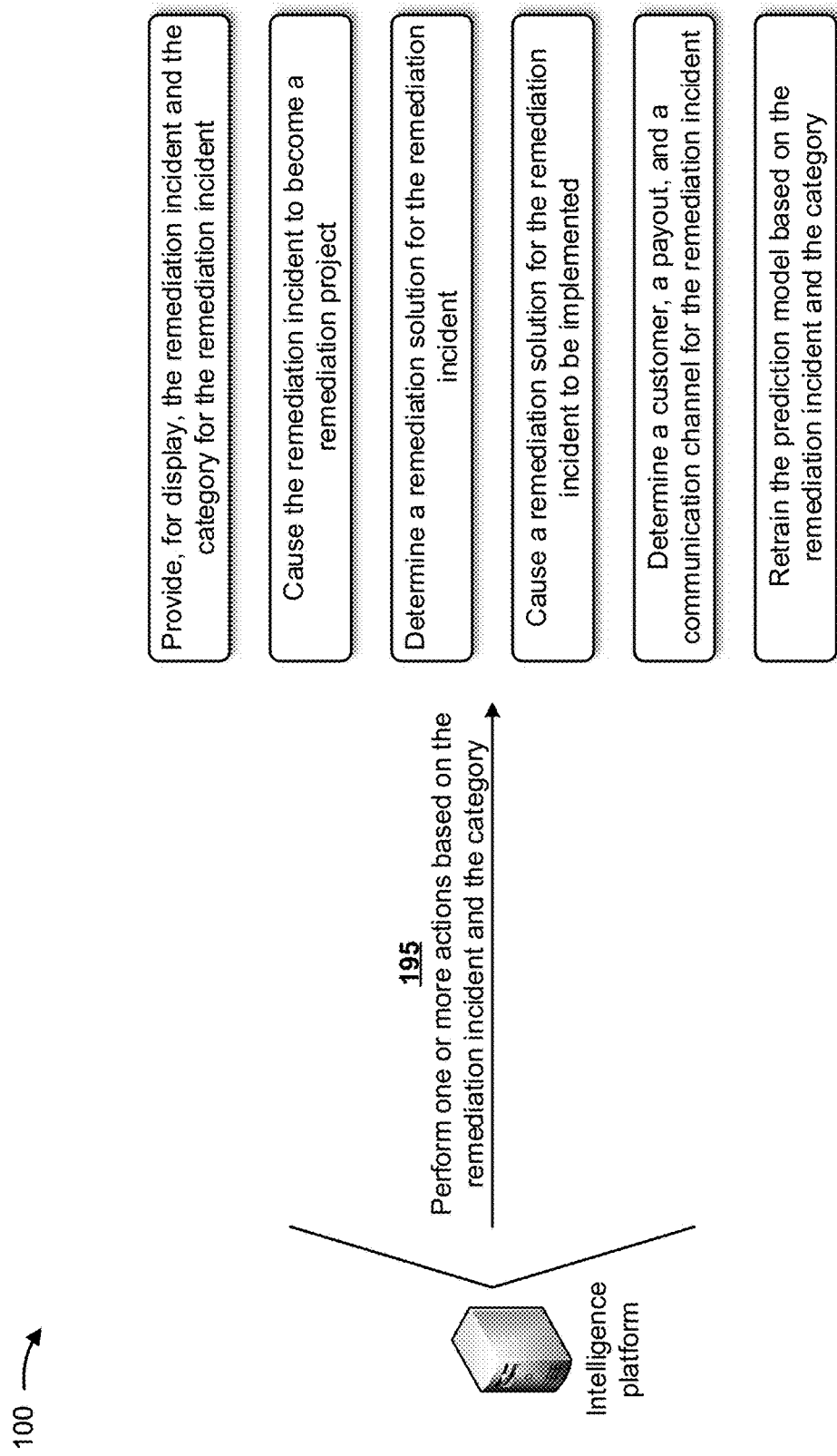

FIGS. 1A-1S are diagrams of one or more example implementations 100 described herein. As shown in FIG. 1A, a server device may be associated with an intelligence platform. The server device may include a data source that stores historical risk data and historical compliance data associated with multiple entities. The intelligence platform may include a platform that utilizes machine learning models to predict risk and compliance data, remediation incidents, and remediation solutions, as described herein.

As further shown in FIG. 1A, and by reference number 105, the intelligence platform may receive, from the server device, historical risk data identifying historical risks, and historical compliance data identifying historical compliance actions. The historical risks and/or the historical compliance actions may be associated with one or more entities (e.g., one or more corporations, one or more educational institutions, one or more government agencies, and/or the like). Each of the one or more entities may monitor risk activities and/or compliance actions associated with each entity, and may store data associated with the monitored risk activities and/or the compliance actions (e.g., the historical risk data and/or the historical compliance data) in a data structure (e.g., a database, a table, a list, and/or the like) associated with the server device.

In some implementations, the historical risks may include historical hazard risks associated with the entities, historical injury risks associated with the entities, historical theft risks associated with the entities, historical operational risks associated with the entities, historical financial risks associated with the entities, historical regulatory risks associated with the entities, historical strategic risks associated with the entities, historical cybersecurity risks associated with the entities, historical fraud risks associated with the entities, and/or the like. In some implementations, the historical compliance actions may include historical compliance with laws by the entities, historical compliance with rules by the entities, historical compliance with regulations by the entities, historical actions taken in response to the historical risks, existing control weaknesses, historical incidents, post obligation breaches, and/or the like. In one example, the laws, rules, regulations, and/or the like, may be enforced by one or more government agencies.

The intelligence platform may continuously receive the historical risk data and the historical compliance data, may periodically (e.g., in hours, days, weeks, and/or the like) receive the historical risk data and the historical compliance data, and/or the like. The intelligence platform may store the historical risk data and the historical compliance data in a data structure (e.g., a database, a table, a list, and/or the like) associated with the intelligence platform.

As shown in FIG. 1B, and by reference number 110, the intelligence platform may process the historical risk data and the historical compliance data, with data models, to generate historical data (e.g., processed historical risk data and historical compliance data). In some implementations, the data models may include smart data manipulation and integration models based on business rules. In some implementations, the intelligence platform may perform natural language processing (e.g., syntax, semantics, discourse, speech, and/or the like) on the historical risk data and the historical compliance data so that the historical risk data and the historical compliance data may be readily interpreted by the intelligence platform. In some implementations, the intelligence platform may pre-process the historical risk data and the historical compliance data by converting formats of the historical risk data and the historical compliance data into at least one predetermined format that may be interpreted by the natural language processing and/or the intelligence platform.

In some implementations, the natural language processing may extract an intent of text (e.g., a question) of the historical risk data and the historical compliance data. An intent may include an intention of an end-user that is conveyed by the end-user, such as, for example, a casual intent, a business intent, and/or the like. A casual intent may include an opening or a closing of a conversation (e.g., greetings such as "hi," "hello," "hola," "ciao," "bye," and/or the like). A casual intent may also include affirmative and negative intents for utterances (e.g., "ok," "yes please," "no not this one but the first one," "nope," and/or the like). A business intent may include an intent that directly maps to a business associated with an entity. For example, if the entity is associated with movie content, then an utterance from a user (e.g., "when was this movie released?") may be a business intent that intends to determine a release year of the movie.

In some implementations, the intelligence platform may pre-process the historical risk data and the historical compliance data before performing the natural language processing on the historical risk data and the historical compliance data and/or before storing the historical risk data and the historical compliance data in the data structure. For example, the intelligence platform may utilize one or more pre-processing techniques to pre-process the historical risk data and the historical compliance data, such as data cleansing techniques, data reduction techniques, data transformation techniques, and/or the like. In some implementations, the intelligence platform may select the one or more pre-processing techniques based on a variety of factors, such as a type associated with the historical risk data and the historical compliance data (e.g., video data, image data, text data, and/or the like), whether a source of the historical risk data and the historical compliance data provides voluminous data that needs to be cleaned and/or reduced in size, whether the historical risk data and the historical compliance data is provided in a format that requires conversion to a particular format that may be utilized by the intelligence platform, and/or the like.

In some implementations, the data cleansing techniques may include techniques that detect and correct (or remove) corrupt or inaccurate records from the historical risk data and the historical compliance data, and that identify incomplete, incorrect, inaccurate, or irrelevant portions of the historical risk data and the historical compliance data and replace, modify, or delete the identified portions of the historical risk data and the historical compliance data. In some implementations, the data reduction techniques may include techniques that transform numerical or alphabetical digital information (e.g., the historical risk data and the historical compliance data) into a corrected, ordered, and simplified form, and that reduce a quantity of the historical risk data and the historical compliance data to meaningful parts. In some implementations, the data transformation techniques may include techniques that convert the historical risk data and the historical compliance data from one format or structure into another format or structure. The data transformation may be simple or complex based on required changes to the historical risk data and the historical compliance data between source (initial) data and target (final) data.

In some implementations, the intelligence platform may further pre-process the historical risk data and the historical compliance data by cleaning the historical risk data and the historical compliance data based on inconsistent values, duplicate records, invalid entries, and/or the like, by merging duplicate records based on industry—specific domain knowledge, and by transforming and scaling the historical risk data and the historical compliance data using data manipulation and feature detection.

As shown in FIG. 1C, and by reference number 115, the intelligence platform may train a model with the historical data to generate a structured semantic model. In some implementations, the model may include a smart data manipulation and integration model based on business rules, a machine learning model, a neural network model, a deep learning model, and/or the like that analyzes a massive amount of data (i.e., an amount of data that cannot be processed objectively by a human actor), recognizes patterns among the data, and makes a prediction without requiring a person to program specific instructions. In one example, the model may be trained to generate semantic information that may include information associated with semantic classes (e.g., hazards, operations, finance, regulations, safety measures, and/or the like), semantic entities (e.g., corporations, government agencies, competitors, suppliers, and/or the like), semantic people (e.g., employees, contractors, regulators, and/or the like), semantic places (e.g., factories, office buildings, warehouses, and/or the like), and/or the like. The intelligence platform may create the structured semantic model based on the semantic information, and may utilize the structured model to generate risk and compliance information associated with an entity, as described below.

In some implementations, the intelligence platform may separate the historical data into a training set, a validation set, a test set, and/or the like. The training set may be utilized to train the model. The validation set may be utilized to validate results of the structured semantic model. The test set may be utilized to test operation of the structured semantic model.

In some implementations, the intelligence platform may train the model using, for example, an unsupervised training procedure and based on the historical data. For example, the intelligence platform may perform dimensionality reduction to reduce the historical data to a minimum feature set, thereby reducing resources (e.g., processing resources, memory resources, and/or the like) to train the neural network, and may apply a classification technique to the minimum feature set.

In some implementations, the intelligence platform may use a logistic regression classification technique to determine a categorical outcome (e.g., risk and compliance information associated with an entity). Additionally, or alternatively, the intelligence platform may use a naïve Bayesian classifier technique. In this case, the intelligence platform may perform binary recursive partitioning to split the historical data into partitions and/or branches, and use the partitions and/or branches to determine outcomes (e.g., risk and compliance information associated with an entity). Based on using recursive partitioning, the intelligence platform may reduce utilization of computing resources relative to manual, linear sorting and analysis of data points, thereby enabling use of thousands, millions, or billions of data points to train the machine learning model, which may result in more accurate models than using fewer data points.

Additionally, or alternatively, the intelligence platform may use a support vector machine (SVM) classifier technique to generate a non-linear boundary between data points in the training set. In this case, the non-linear boundary is used to classify test data into a particular class.

Additionally, or alternatively, the intelligence platform may train the model using a supervised training procedure that includes receiving input to the model from a subject matter expert, which may reduce an amount of time, an amount of processing resources, and/or the like to train the model relative to an unsupervised training procedure.

In some implementations, the intelligence platform may use one or more other model training techniques, such as a latent semantic indexing technique, and/or the like. For example, the intelligence platform may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the structured semantic model generated by the intelligence platform by making the structured semantic model more robust to noisy, imprecise, or incomplete data, and by enabling the intelligence platform to detect patterns and/or trends undetectable to human analysts or systems using less complex techniques.

In some implementations, rather than training the model, the intelligence platform may obtain the structured semantic model from another system or device that trained the model to generate the structured semantic model. In this case, the intelligence platform may provide the other system or device with the historical data for use in training the model, and may provide the other system or device with updated historical data to retrain the model in order to update the structured semantic model.

As shown in FIG. 1D, and by reference number 120, the intelligence platform may receive, from client devices and server devices associated with an entity, entity risk data identifying new and existing risks of the entity, and entity compliance data identifying new and existing compliance actions of the entity. The new and existing risks and/or the new and existing compliance actions may be associated with an entity not included in the one or more entities described above in connection with FIG. 1A. In some implementations, the new and existing risks may include new and existing hazard risks associated with the entity, new and existing injury risks associated with the entity, new and existing theft risks associated with the entity, new and existing operational risks associated with the entity, new and existing financial risks associated with the entity, new and existing regulatory risks associated with the entity, new and existing strategic risks associated with the entity, new and existing cybersecurity risks associated with the entity, new and existing fraud risks associated with the entity, and/or the like. In some implementations, the new and existing compliance actions may include new and existing compliance with laws by the entity, new and existing compliance with rules by the entity, new and existing compliance with regulations by the entity, actions taken in response to the new and existing risks, and/or the like.

The intelligence platform may continuously receive the entity risk data and the entity compliance data, may periodically (e.g., in hours, days, weeks, and/or the like) receive the entity risk data and the entity compliance data, and/or the like. The intelligence platform may store the entity risk data and the entity compliance data in a data structure (e.g., a database, a table, a list, and/or the like) associated with the intelligence platform.

As shown in FIG. 1E, and by reference number 125, the intelligence platform may process the entity risk data and the entity compliance data, with the structured semantic model, to determine risk and compliance insights for the entity. The risk and compliance insights may include risk management insights (e.g., key performance indicators (KPIs), satisfaction of KPIs, and/or the like), insights associated with compliance issues, risks associated with audit and regulatory issues, risks associated with financial impact issues, operational risks, compliance risks, qualification of controls for risks, risks associated with conduct issues, risks associated with performance of networks and/or network devices associated with the entity and access to the networks and/or network devices, indications of how controls are performing so the entity understands what needs to be enhanced, indications of delineation of accountabilities across the entity, indications of levels of predictability in controls behavior, and/or the like. In some implementations, the intelligence platform may store the risk and compliance insights in a data structure (e.g., a database, a table, a list, and/or the like) associated with the intelligence platform. The intelligence platform may provide the risk and compliance insights for display to a user of the intelligence platform, to a computing device (e.g., directly, via a hyperlink, and/or the like) associated with the intelligence platform, and/or the like.

In some implementations, the intelligence platform may provide for display one or more user interfaces that include end-to-end (E2E) risk and compliance insight views (e.g., E2E value chains, integrated insights across issues, incidents, risks, controls, remediation, conduct, and/or the like); integrated compliance insights (e.g., an integrated view of compliance and related obligations, insights ownership and accountability, and/or the like); predictive insights (e.g., associated with complaints and call logs, emerging risks, controls under stress, unknown issues, and/or the like); enhanced usability (e.g., executive level insights, smart alerts and notifications, and/or the like); integrated action management (e.g., smart workflows to drive actions and/or outcomes); and/or the like.

In some implementations, the intelligence platform may utilize historical operational risk and compliance events (e.g., control weaknesses, existing risks, incidents, issues, obligation breaches, and/or the like) and historical indicators of such events (e.g., customer complaints, calls and interactions, and/or the like) with natural language processing and a machine learning model to predict emerging operational risk and compliance events (e.g., emerging control weaknesses, risks, obligation breaches, issues, incidents, and/or the like). In such implementations, the intelligence platform may provide personalized actionable insights to alert accountable executives in an organization so that proactive actions can be taken to avert the emerging operational risk and compliance events.

As shown in FIG. 1F, and by reference number 130, the intelligence platform may perform one or more actions based on the risk and compliance insights. In some implementations, the one or more actions may include the intelligence platform providing, for display, the risk and compliance insights. For example, the intelligence platform may display vertical and horizontal views of risk and compliance insights. A vertical view may represent lines of accountability that permit executives to view individual obligations and responsibilities across respective value chains. A horizontal view may represent an entity compliance evaluation that provides a view of the entity's compliance. In this way, the intelligence platform may reduce intervention time when issues arise, thereby conserving computing resources (e.g., processing resources, memory resources, communication resources, and/or the like), networking resources, and/or the like that would otherwise be wasted in identifying individual obligations and responsibilities, evaluating compliance, presenting the individual obligations and responsibilities, and/or the like.

In some implementations, the intelligence platform may provide, for display, user interfaces that include various forms of the risk and compliance insights, combined with related information. For example, a user interface may include information associated with KPIs (e.g., a number of products that were subject to remedial action, a number of customers experiencing dissatisfaction, a number of payments made to a customer arising from remediation initiatives, and/or the like), satisfaction of the KPIs by the entity, required tasks associated with the KPIs, and/or the like. As another example, a user interface (e.g., a dashboard) may include information associated with qualified controls, operational incidents, compliance incidents, audit and regulatory issues, financial impact of incidents and issues, risks associated with incidents and issues, obligation requirements, alerts of incidents and issues, and/or the like. As another example, a user interface may include information associated with qualified controls for risks, completion of mandatory training, compliance with policies, transaction monitoring, investment governance, review of marketing materials, legal approval, and/or the like.

As still another example, a user interface may include drill-down functionality to provide actionable insights from dashboards, metrics across various dashboards to drive further targeted action on control and issue management, a value chain view (e.g., of aggregated inherent versus residual risk ratings, portfolio and/or product-specific risk scoring, and/or the like), drill-down functionality that provides actionable insights, improvements tracking and proactive management, and/or the like.

In some implementations, the intelligence platform may provide an interactive application (e.g., a chat bot) that enables a user of the intelligence platform to ask for and receive particular risk and/or compliance information from the intelligence platform. The chat bot may include a computer program that conducts conversations via auditory and/or textual methods, and may provide mechanisms for user input to and interaction with the intelligence platform. For example, the chat bot may guide a determination of the greatest risk facing the entity, a determination of compliance actions in place to address the greatest risk, a determination of a potential financial loss due to the greatest risk, and/or the like. In some implementations, the chat bot may include an artificial intelligence virtual assistant (AIVA) chat bot, a JavaScript (JS) chat bot, a Hubot chat bot, and/or the like. The chat bot may provide parsing (e.g., a technique that includes analyzing input text and manipulating the text by using a number of natural language processing functions), pattern matching (e.g., a technique that is used in question-answer systems depending on matching types, such as natural language inquiries, simple statements, or semantic meaning of inquiries), artificial intelligence markup language (AIML) (e.g., a technique for creating natural language software agents), a chat script (e.g., a technique that helps when no matches occur in AIML, concentrates on best syntax to create a sensible default answer, and provides a set of functionalities such as variable concepts, facts, and logic), a relational database (e.g., a technique to remember previous conversations), a Markov chain (e.g., a technique to build responses that are more applicable probabilistically and, consequently, are more correct), language additions (e.g., sentences, phrases, or paragraphs that add variety to a knowledge base and make it more convincing), ontologies (e.g., a set of concepts that are interconnected relationally and hierarchically, and may be used to compute a relation between the concepts, such as synonyms, hyponyms and other relations which are natural language concept names), and/or the like.

As further shown in FIG. 1F, the one or more actions may include the intelligence platform determining operational risk and reporting analytics based on the risk and compliance insights. For example, the intelligence platform may include a single integrated analytics and dashboards layer that provides insights across issues, incidents, risks, controls, and/or the like. In this way, the intelligence platform may provide a single source of insights about operational risk to drive consistent progress tracking, drive accountability and continuous improvement across business units, and/or the like, thereby conserving computing resources, networking resources, and/or the like that would otherwise be wasted in referencing and/or reconciling multiple sources of insights.

As further shown in FIG. 1F, the one or more actions may include the intelligence platform determining predictions for proactive responses based on the risk and compliance insights. For example, the intelligence platform may predict obligation breaches, control failures and emerging risks based on events (e.g., complaints, issues, and/or the like); may predict impacts on customer campaigns; may identify fraud, conduct issues, and/or the like based on employee and customer transactions; and/or the like. In this way, the intelligence platform may enable preventative actions to reduce obligation breaches, improve customer outcomes, and reduce costs (e.g., by preventing remediation of issues), and/or the like, thereby conserving resources that would otherwise be wasted reactively responding to issues, reactively remediating issues, and/or the like.

As further shown in FIG. 1F, the one or more actions may include the intelligence platform determining a proactive data quality management plan based on the risk and compliance insights. For example, the intelligence platform may utilize machine learning to identify data quality issues associated with the entity risk data and/or the entity compliance data, may apply auto-tagging and classification to improve the quality of the entity risk data and/or the entity compliance data, and/or the like. In this way, the intelligence platform may identify data quality gaps, for responsible individuals, to drive actions, may automatically correct or prevent data quality issues at a point of data entry using smart skins and/or auto-filling techniques, and/or the like, which may conserve computing resources, networking resources, and/or the like that would otherwise be wasted in generating incorrect risk and compliance insights based data with quality issues.

As further shown in FIG. 1F, the one or more actions may include the intelligence platform determining an integrated action management plan based on the risk and compliance insights. For example, the intelligence platform may integrate the risk and compliance insights with action management and/or workflows, that can be triggered, monitored, and/or acted on by management, that can be automated, and/or the like. In this way, the intelligence platform may automatically enable actions to be performed on the risk and compliance insights (e.g., issue closure or complaint/exception handling to accelerate the outcomes).

As further shown in FIG. 1F, the one or more actions may include the intelligence platform causing a particular compliance action to be performed to address a particular risk. In this way, the intelligence platform may automatically identify and implement a compliance action that is appropriate to address the particular risk, thereby conserving resources that would otherwise be wasted in attempting to identify a correct compliance action to be performed in association with the particular risk, implementing a group of compliance actions to determine which address the particular risk, scheduling performance of the group of compliance actions, and/or the like.

As further shown in FIG. 1F, the one or more actions may include the intelligence platform retraining the structured semantic model based on the risk and compliance insights. In this way, the intelligence platform may improve the accuracy of the machine learning model in processing the entity risk data and the entity compliance data, which may improve speed and efficiency of the machine learning model and conserve computing resources, networking resources, and/or the like.

In some implementations, the one or more actions may include the intelligence platform generating a compliance report for a regulatory audit based on the risk and compliance insights for the entity, and providing the compliance report to a regulatory authority. In this way, the intelligence platform may automatically and efficiently provide the compliance report, thereby saving time and resources that would otherwise be wasted in preparing and communicating the compliance report to the regulatory authority.

In some implementations, the one or more actions may include the intelligence platform generating one or more notifications for a mobile application based on the risk and compliance insights for the entity, and providing the one or more notifications to the mobile application stored in a client device. In this way, the intelligence platform may automatically and efficiently communicate the notifications to one or more parties who may act on the notifications, thereby saving time and resources that would otherwise be wasted in identifying the parties, communicating the notifications to the parties, and/or the like.

In this way, the intelligence platform may simplify risk monitoring and detection, may enable real-time risk reporting, may reduce time spent analyzing data, may increasing a time required to determine an insight, and/or the like. Furthermore, the intelligence platform may provide controls optimization that receives risk and compliance data from multiple systems, aggregates risk posture, and automatically generates comprehensive visualizations, predictive indicators, and deep insights that improve an understanding of risk, decision making, and/or the like. The intelligence platform may provide consistent and accurate information that can be used for regulatory, compliance, and audit purposes, thereby enabling effective and proactive risk management and reducing regulatory actions and fines.

In some implementations, the intelligence platform may provide user-friendly user interfaces that include entire portfolio risks, issues, and sub-process controls mapped to a value chain; include tailored reports that provide a snapshot of important issues, unresolved issues (e.g., more than one year and extended at least once), and/or the like; include a personalized dashboard to summarize actions with respect to controls, issues, and incidents to improve risk and control environment; and/or the like.

As shown in FIG. 1G, and by reference number 135, the intelligence platform may receive, from client devices and server devices associated with an entity, business rules associated with the entity and transaction data identifying transactions associated with the entity. In some implementations, when receiving the business rules associated with the entity, the intelligence platform may utilize crawlers to retrieve documents associated with the entity, and may perform optical character recognition and natural language processing on the documents to identify the business rules in the documents. In some implementations, the business rules may define some aspect of the entity; may provide structure, control, or influence of a behavior of the entity; may include operations, definitions, constraints, and/or the like that apply to the entity; may apply to people, processes, entity behavior, networks, network devices, and/or the like of the entity; and/or the like.

In some implementations, transaction data may include the transaction data may include data identifying customers of the entity, employees of the entity, accounts associated with the customers, transactions being conducted by the customers and/or the employees, products and/or services of the entity and associated with the transactions, and/or the like. In some implementations, the intelligence platform may be associated with hundreds, thousands, millions, and/or the like of server device and/or client devices may receive the transaction data from the server devices and/or the client devices.

The intelligence platform may continuously receive the business rules and/or the transaction data, may periodically (e.g., in hours, days, weeks, and/or the like) receive the business rules and/or the transaction data, and/or the like. The intelligence platform may store the business rules and/or the transaction data in a data structure (e.g., a database, a table, a list, and/or the like) associated with the intelligence platform.

As shown in FIG. 1H, and by reference number 140, the intelligence platform may process the transaction data and the business rules, with an anomaly detection model, to identify a remediation issue associated with the transaction data (e.g., a failure of the entity to comply with a regulation). For example, with regard to a financial institution, the remediation issue may include an incorrect fee charged, an incorrect interest rate, incorrect mortgage or refinancing, inappropriate sales and service practices, incorrect customer advice, incorrectly applied bonus points or cash back, external fraud not detected by the financial institution (e.g., phishing, unauthorized transactions, and/or the like), inadvertent closure of an account, incorrect disbursements, and/or the like.

In some implementations, the intelligence platform may train the anomaly detection model, in a manner similar to the machine learning model described above in connection with FIG. 1C, to generate a trained anomaly detection model. In some implementations, rather than training the anomaly detection model, the intelligence platform may obtain the anomaly detection model from another system or device that trained the anomaly detection model to generate the trained anomaly detection model. In this case, the intelligence platform may provide the other system or device with historical transaction data and business rules for use in training the anomaly detection model, and may provide the other system or device with updated historical transaction data and business rules to retrain the anomaly detection model in order to update the anomaly detection model.

In some implementations, the intelligence platform may utilize optical character recognition to convert customer commitments and/or obligations into a machine readable form, and may utilize natural language processing to analyze the machine readable for and identify business rules for the customer obligations and/or commitments. The business rules may be provided to machine learning models (e.g., the anomaly detection model) to detect anomalous customer accounts and to calculate payments for each customer.

As shown in FIG. 1I, and by reference number 145, the intelligence platform may process data identifying the remediation issue, with a root cause model, to determine a root cause and a severity of the remediation issue. In some implementations, the root cause of the remediation issue may include an initiating cause of either a condition chain or a causal chain that leads to an outcome or effect of interest. For example, for a remediation issue associated with responsible lending of a financial institution, the root cause may include providing irresponsible advice to customers about lending. In another example, for a remediation issue associated with missed bonus points and/or cash back, the root cause may include incorrect terms and conditions associated with customer accounts. In some implementations, the severity of the remediation issue may include a level or a value associated with a quantity of customers affected by the remediation issue, an amount of money required for the remediation issue, and/or the like. For example, the severity of the remediation issue may increase as the quantity of customers affected increases, as the amount of money required increases, and/or the like.

In some implementations, the intelligence platform may train the root cause model, in a manner similar to the machine learning model described above in connection with FIG. 1C, to generate a trained root cause model. In some implementations, rather than training the root cause model, the intelligence platform may obtain the root cause model from another system or device that trained the root cause model to generate the trained root cause model. In this case, the intelligence platform may provide the other system or device with historical remediation issue data for use in training the root cause model, and may provide the other system or device with updated historical remediation issue data to retrain the root cause model in order to update the root cause model.

As shown in FIG. 1J, and by reference number 150, the intelligence platform may process data identifying the remediation issue, the root cause, and the severity, with a customer identifier model, to identify customers affected by the remediation issue. In some implementations, the intelligence platform may identify a quantity of customers affected by the remediation issue, an amount of money to be paid to the quantity of customers, identities of the quantities of customers, and/or like.

In some implementations, the intelligence platform may train the customer identifier model, in a manner similar to the machine learning model described above in connection with FIG. 1C, to generate a trained customer identifier model. In some implementations, rather than training the customer identifier model, the intelligence platform may obtain the customer identifier model from another system or device that trained the customer identifier model to generate the trained customer identifier model. In this case, the intelligence platform may provide the other system or device with the historical remediation issue, root cause, and severity data for use in training the customer identifier model, and may provide the other system or device with updated historical remediation, root cause, and severity data to retrain the customer identifier model in order to update the customer identifier model.

As shown in FIG. 1K, and by reference number 155, the intelligence platform may process data identifying the remediation issue, the root cause, the severity, and the customers, with a remediation solution model, to determine a remediation solution for the remediation issue. In some implementations, the remediation solution may include correcting a failure of the entity to comply with a regulation, correcting an error by the entity that cost customers money, correcting an error by the entity that deprived customers of a benefit, and/or the like. For example, for a remediation issue associated customers that did not receive a benefit of a loan rate change, the remediation solution may include paying the customers a difference between a previous rate and a new rate for a duration of the loan rate change.

In some implementations, the intelligence platform may train the remediation solution model, in a manner similar to the machine learning model described above in connection with FIG. 1C, to generate a trained remediation solution model. In some implementations, rather than training the remediation solution model, the intelligence platform may obtain the remediation solution model from another system or device that trained the remediation solution model to generate the trained remediation solution model. In this case, the intelligence platform may provide the other system or device with historical data for use in training the remediation solution model, and may provide the other system or device with updated historical data to retrain the remediation solution model in order to update the remediation solution model.

In some implementations, the intelligence platform may cause the remediation solution to be implemented for the customers. For example, the intelligence platform may cause the remediation solution to be implemented as described below in connection with FIGS. 1L and 1M. In some implementations, the intelligence platform may provide, for display, a user interface that includes data identifying progress associated with implementation of the remediation solution. In some implementations, when causing the remediation solution to be implemented, the intelligence platform may cause the remediation solution to be assigned to an employee of the entity, may track progress of the employee with regard to implementing the remediation solution, may provide, for display, a user interface that includes data identifying the progress of the employee with regard to implementing the remediation solution, and/or the like.

As shown in FIG. 1L, and by reference number 160, the intelligence platform may calculate a payment for each of the customers based on data identifying the remediation solution and the customers. In some implementations, one or more of the payments for the customers may be the same, may be different, and/or the like depending on the remediation solution and situations of the customers. For example, the remediation solution may be applied to three customers (e.g., customer A, customer B, and customer C), and the intelligence platform may calculate a payment of $X for customer A, a payment of $X for customer B, and payment of $Y for customer C (e.g., where $Y is greater than $X since customer C lost more money than customer A and customer B).

As shown in FIG. 1M, and by reference number 165, the intelligence platform may generate communication channels for the customers and provide the payments to the customers via corresponding communication channels. In some implementations, the intelligence platform may automatically identify a communication channel for each of the customers based on customer preferences, regulatory requirements, and/or the like. For example, if the customer prefers to be contacted via email, the intelligence platform may identify an email as the communication channel for the customer. In another example, if regulations require that the customers be contacted via a written letter for the remediation solution, the intelligence platform may identify a written letter as the communication channel for the customers. In some implementations, the communication channels may include an email, postal mail, a telephone call, a chat bot, an instant message, a transaction account, and/or the like.

In some implementations, the intelligence platform may automatically populate a communication about the remediation issue with appropriate language (e.g., based on regulatory requirements), customer information, a check for the payment to the customer, and/or the like. In this way, the intelligence platform may ensure that a uniform communication is provided to each of the customers. In some implementations, the intelligence platform may provide a virtual agent (e.g., a chat bot) that provides a full time communication channel for implementing the remediation solution.

In this way, the intelligence platform may improve customer satisfaction, may reduce an amount of time required for resolution of remediation issues, which may reduce compensation payments (e.g., due to timely payments), may reduce or eliminate compensatory interest payments, may reduce operational costs, may provide proactive remediation issue identification, and/or the like. For example, identification of remediation issues through complaints and call log analysis may lead to early remediation issue identification, faster remediation solutions, a reduction in complaints, and/or the like.

With reference to FIG. 1N, the intelligence platform may receive historical remediation incidents data from server devices and/or client devices associated with entities. In some implementations, with regard to a financial institution, the historical remediation incidents data may include data identifying an incorrect fee charged, an incorrect interest rate, incorrect mortgage or refinancing, in appropriate sales and service practices, incorrect customer advice, incorrectly applied bonus points or cash back, external fraud not detected by the financial institution (e.g., phishing, unauthorized transactions, and/or the like), inadvertent closure of an account, incorrect disbursements, and/or the like.

The intelligence platform may continuously receive the historical remediation incidents data, may periodically (e.g., in hours, days, weeks, and/or the like) receive the historical remediation incidents data, and/or the like. The intelligence platform may store the historical remediation incidents data in a data structure (e.g., a database, a table, a list, and/or the like) associated with the intelligence platform.

As shown in FIG. 1N, and by reference number 170, the intelligence platform may group the historical remediation incidents data into remediation incidents categories based on remediation themes and subjects (e.g., associated with remediation issues). In some implementations, the remediation incidents categories may include a category for incidents in which an incorrect fee was charged, a category for incidents in which an incorrect interest rate was applied, a category for incidents in which bonus points and/or cash back credits are missing (e.g., because terms and conditions were incorrectly applied), a category for incidents associated with incorrect customer advice, a category for incidents in which external fraud was not detected, and/or the like.

As shown in FIG. 1O, and by reference number 175, the intelligence platform may enrich the remediation incident categories with historical remediation project data to generate enriched remediation incidents categories. In some implementations, the intelligence platform may receive the historical remediation project data from server devices and/or client devices associated with the entities. The historical remediation project data may include data identifying remediation solutions that were implemented (e.g., where customers received payments) to resolve remediation incidents. In some implementations, the enriched remediation incidents categories may include a category for incidents in which there are remaining balance issues (e.g., a positive balance in credit upon closure or dormancy), a category for incidents associated with mortgage and other lending refinancing errors, a category for incidents associated with non-adherence to guidelines for lending products, a category for incidents associated with non-adherence to guidelines for non-lending products, and/or the like.

As shown in FIG. 1P, and by reference number 180, the intelligence platform may map complaints data, with the enriched remediation incidents categories, to generate training data. In some implementations, the intelligence platform may receive the complaints data from server devices and/or client devices associated with the entities. The complaints data may include data identifying complaints received from customers by the entities over a time period, complaints received from the customers that result in remediation issues, complaints received from the customers that do not result in remediation issues, and/or the like. In some implementations, the training data may include the remediation incidents categories; the enriched remediation incidents categories; the complaints data; data identifying incidents associated with potentially illegitimate activity (e.g., phishing, unauthorized transactions, external fraud, disputed transactions, and/or the like), disaster relief policy errors, payment issues (e.g., incorrect disbursements, incorrect credit of funds, and/or the like), non-remediation incidents categories; other categories; and/or the like. The non-remediation incidents categories may include non-remediation complaints and/or issues where the entities are not at fault, non-remediation complaints and/or issues associated with false positive keywords, and/or the like. The other categories may include remediation incidents that do not contain sufficient information to be categorized.

As shown in FIG. 1Q, and by reference number 185, the intelligence platform may train a prediction model with the training data to generate a trained prediction model. In some implementations, the intelligence platform may train the prediction model, in a manner similar to the machine learning model described above in connection with FIG. 1C, to generate the trained prediction model. In some implementations, rather than training the prediction model, the intelligence platform may obtain the prediction model from another system or device that trained the prediction model to generate the trained prediction model. In this case, the intelligence platform may provide the other system or device with the training data for use in training the prediction model, and may provide the other system or device with updated training data to retrain the prediction model in order to update the prediction model.

In some implementations, when training the prediction model, the intelligence platform may generate the prediction model based on a supervised machine learning model. For example, the intelligence platform may perform a training data mapping step, a model development and training step, and a model prediction step. The training data mapping step may include mapping the complaints data to remediation incidents categories to generate the training data (e.g., as described above), identifying key words in the training data, identifying key phrases in the training data, identifying synonyms in the training data, and/or the like. The model development and training step may include training of a machine learning model (e.g., the prediction model) based on the training data. The model prediction step may include applying the trained machine learning model (e.g., the trained prediction model) to predict whether a complaint may lead to a remediation incident, to predict a type of the remediation incident, and/or the like.

As shown in FIG. 1R, and by reference number 190, the intelligence platform may process a new complaint, with the trained prediction model, to predict a remediation incident for the new complaint and a category for the remediation incident. In some implementations, the intelligence platform may receive the new complaint from a client device or a server device associated with an entity. In some implementations, the trained prediction model may predict that the new complaint may not turn into a remediation incident. In some implementations, the remediation incident for the new complaint may include an incorrect fee charged, an incorrect interest rate, incorrect mortgage or refinancing, in appropriate sales and service practices, incorrect customer advice, incorrectly applied bonus points or cash back, external fraud not detected by the entity, inadvertent closure of an account, incorrect disbursements, and/or the like. The category for the remediation incident may include a category associated with an incorrect fee, a category associated with an incorrect interest rate, a category associated with missing bonus points and/or cash back credits, a category associated with incorrect customer advice, a category associated with undetected external fraud, and/or the like.

In some implementations, the intelligence platform may process another new complaint associated with the entity, with the trained prediction model, to predict a minimal financial impact associated with the other new complaint, and may classify the other new complaint as a non-remediation incident based on the minimal financial impact associated with the other new complaint. In some implementations, the intelligence platform may process another new complaint associated with the entity, with the trained prediction model, to predict a non-remediation incident associated with the other new complaint, and may classify the other new complaint as the non-remediation incident.

As shown in FIG. 1S, and by reference number 195, the intelligence platform may perform one or more actions based on the remediation incident and the category for the remediation incident. In some implementations, the one or more actions may include the intelligence platform providing, for display, the remediation incident and the category for the remediation incident. For example, the intelligence platform may provide a user interface, that includes the remediation incident and the category for the remediation incident, to a user device used by personnel associated with the entity (e.g., a complaint analyst, remediation personnel, and/or the like). In this way, the intelligence platform may automatically enable the personnel to access and/or review the remediation incident and/or the remediation incident category and make informed decisions based on the access and review, thereby saving time and conserving computing resources (e.g., processing resources, memory resources, communication resources, and/or the like), networking resources, and/or the like that would otherwise be wasted in providing and coordinating complaint information for review, analysis, and action.

In some implementations, the one or more actions may include the intelligence platform causing the remediation incident to become a remediation project. For example, the intelligence platform may determine that the remediation incident is not linked to an existing remediation project, may determine that the remediation incident is associated with a quantifiable financial impact, and may cause a remediation project to be formalized. In this way, the intelligence platform may automatically and efficiently determine whether a remediation project is warranted and may cause the remediation project to be generated, thereby conserving time and resources associated with remediating complaints.

In some implementations, the one or more actions may include the intelligence platform determining a remediation solution for the remediation incident. In this way, the intelligence platform may save time and conserve computing resources, network resources, and/or the like that would otherwise be wasted incorrectly determining a remediation solution, correcting the incorrectly determined remediation solution, and/or the like.

In some implementations, the one or more actions may include the intelligence platform causing a remediation solution for the remediation incident to be implemented. For example, the intelligence platform may cause calculated remediation payments to be provided to accounts of customers affected by the remediation incident (e.g., via wire transfers to financial institutions of the customers). In this way, the intelligence platform may automatically cause implementation of the remediation solution, thereby saving time and conserving computing resources, network resources, and/or the like that would otherwise be wasted incorrectly determining a remediation solution, correcting the incorrectly determined remediation solution, scheduling implementation of the remediation solution, and/or the like.

In some implementations, the one or more actions may include the intelligence platform determining a customer, a payout, and a communication channel for the remediation incident. In this way, the intelligence platform may automatically determine an appropriate response to the remediation incident, thereby conserving computing resources, network resources, and/or the like by automatically and efficiently identifying the customer, determining an appropriate compensation, and utilizing channels that are more cost-effective and/or that result in higher customer satisfaction.

In some implementations, the one or more actions may include the intelligence platform retraining the prediction model based on the remediation incident and the category. In this way, the intelligence platform may improve the accuracy of the prediction model in processing the new complaint, which may improve speed and efficiency of the machine learning model and conserve computing resources, networking resources, and/or the like.

In this way, several different stages of the process for predicting risk and compliance data, remediation incidents, and remediation solutions are automated via machine learning, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes machine learning models to predict risk and compliance data, remediation incidents, and remediation solutions in the manner described herein. Finally, the process for utilizing machine learning models to predict risk and compliance data, remediation incidents, and remediation solutions conserves computing resources, networking resources, human resources, and/or the like that would otherwise be wasted in providing poor risk and compliance, making misinformed decisions regarding risk and compliance, inefficiently performing remediation, performing incorrect remediation due to misinformed decisions regarding risk and compliance, and/or like.

As indicated above, FIGS. 1A-1S are provided merely as examples. Other examples may differ from what is described with regard to FIGS. 1A-1S.

Figure 2:
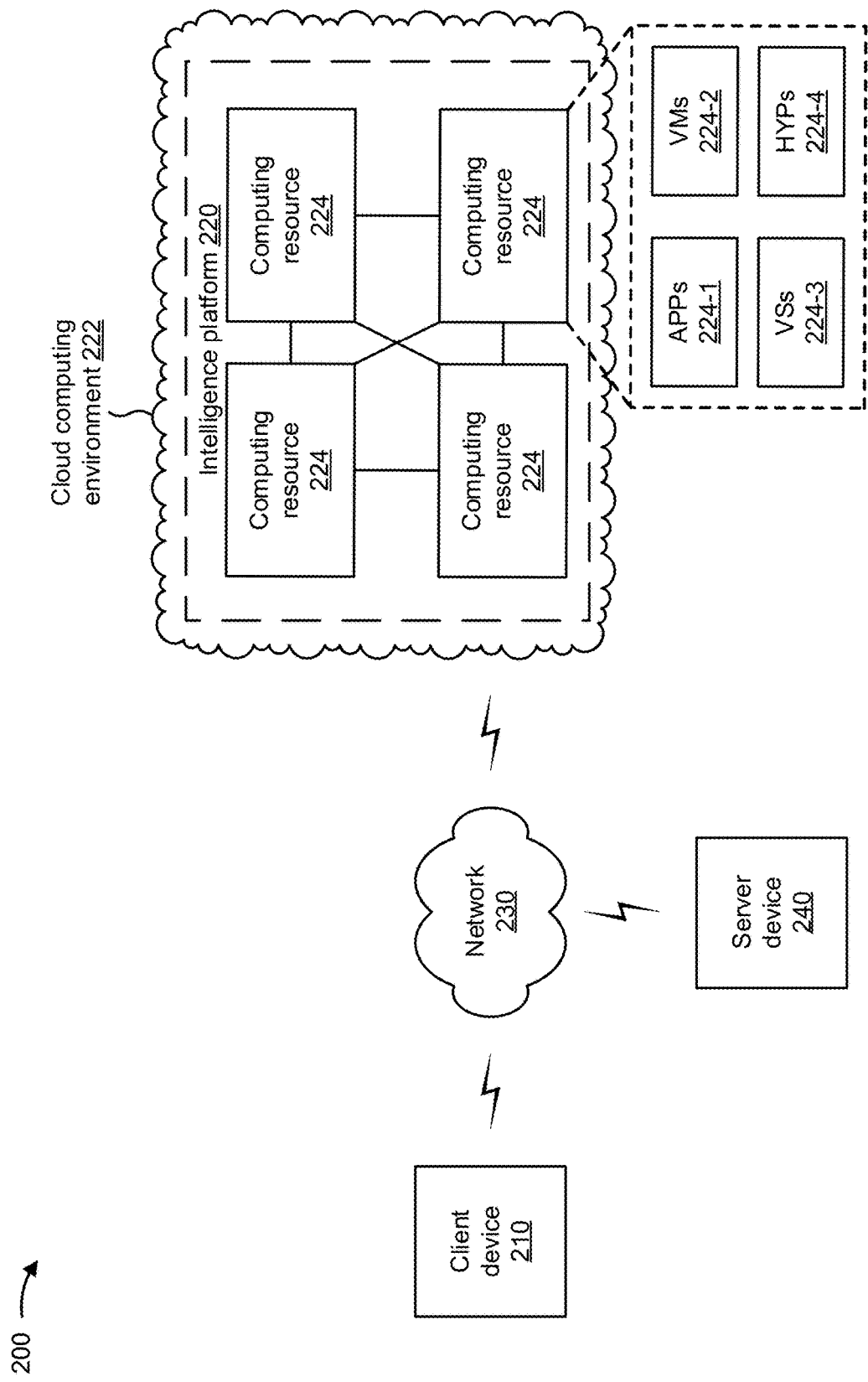
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, an intelligence platform 220, a network 230, and a server device 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to intelligence platform 220 and/or server device 240.

Intelligence platform 220 includes one or more devices that utilize machine learning models to predict risk and compliance data, remediation incidents, and remediation solutions. In some implementations, intelligence platform 220 may be designed to be modular such that certain software components may be swapped in or out depending on a particular need. As such, intelligence platform 220 may be easily and/or quickly reconfigured for different uses. In some implementations, intelligence platform 220 may receive information from and/or transmit information to one or more client devices 210 and/or server devices 240.

In some implementations, as shown, intelligence platform 220 may be hosted in a cloud computing environment 222. Notably, while implementations described herein describe intelligence platform 220 as being hosted in cloud computing environment 222, in some implementations, intelligence platform 220 may not be cloud-based (i.e., may be implemented outside of a cloud computing environment) or may be partially cloud-based.

Cloud computing environment 222 includes an environment that hosts intelligence platform 220. Cloud computing environment 222 may provide computation, software, data access, storage, etc., services that do not require end-user knowledge of a physical location and configuration of system(s) and/or device(s) that hosts intelligence platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host intelligence platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210 and/or server device 240. Application 224-1 may eliminate a need to install and execute the software applications on client device 210. For example, application 224-1 may include software associated with intelligence platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of intelligence platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device. In some implementations, server device 240 may receive information from and/or transmit information to client device 210 and/or intelligence platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
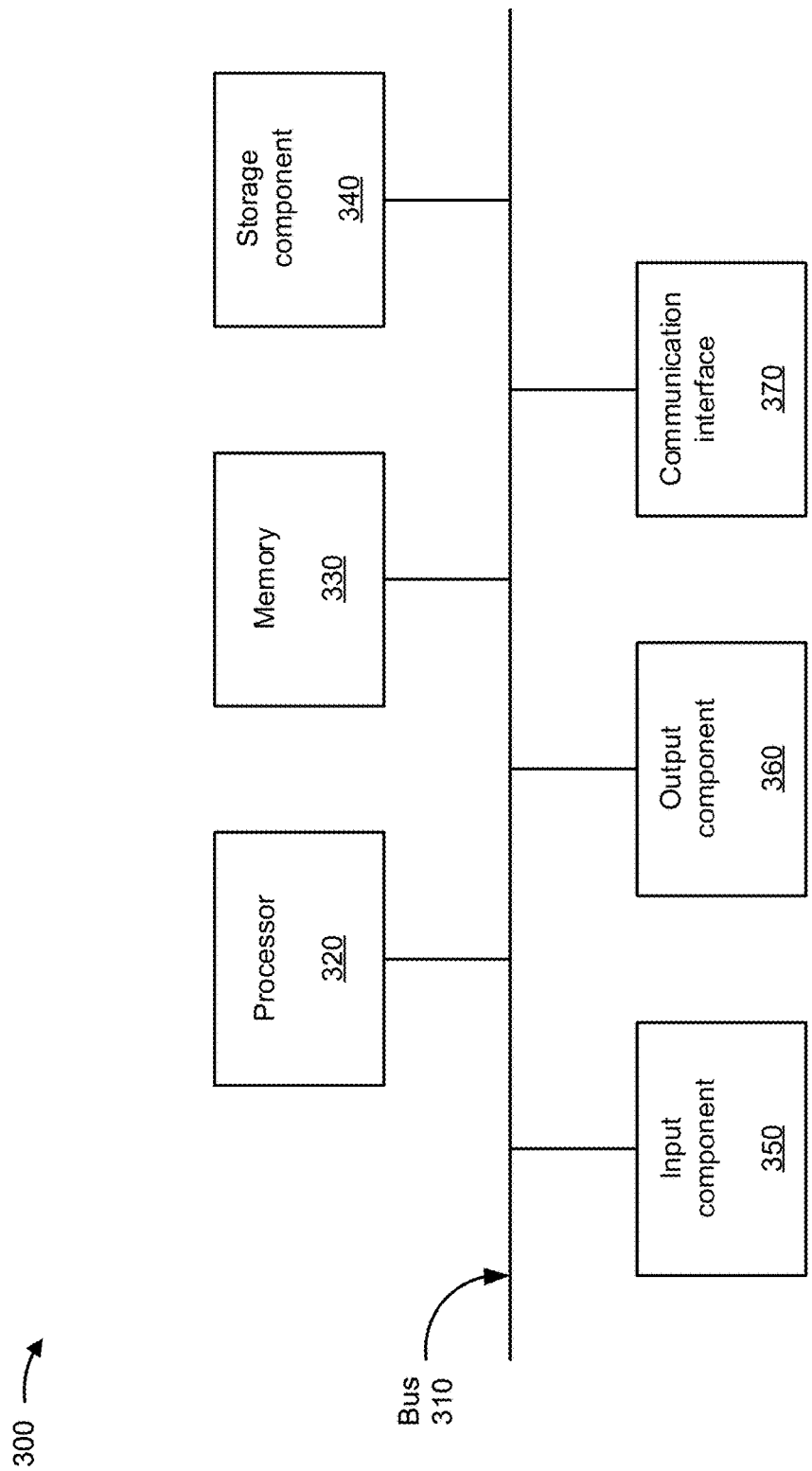
FIG. 3 is a diagram of example components of one or more devices of FIG. 2.

FIG. 3 is a diagram of example components of a device 300. Device 300 may correspond to client device 210, intelligence platform 220, computing resource 224, and/or server device 240. In some implementations, client device 210, intelligence platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
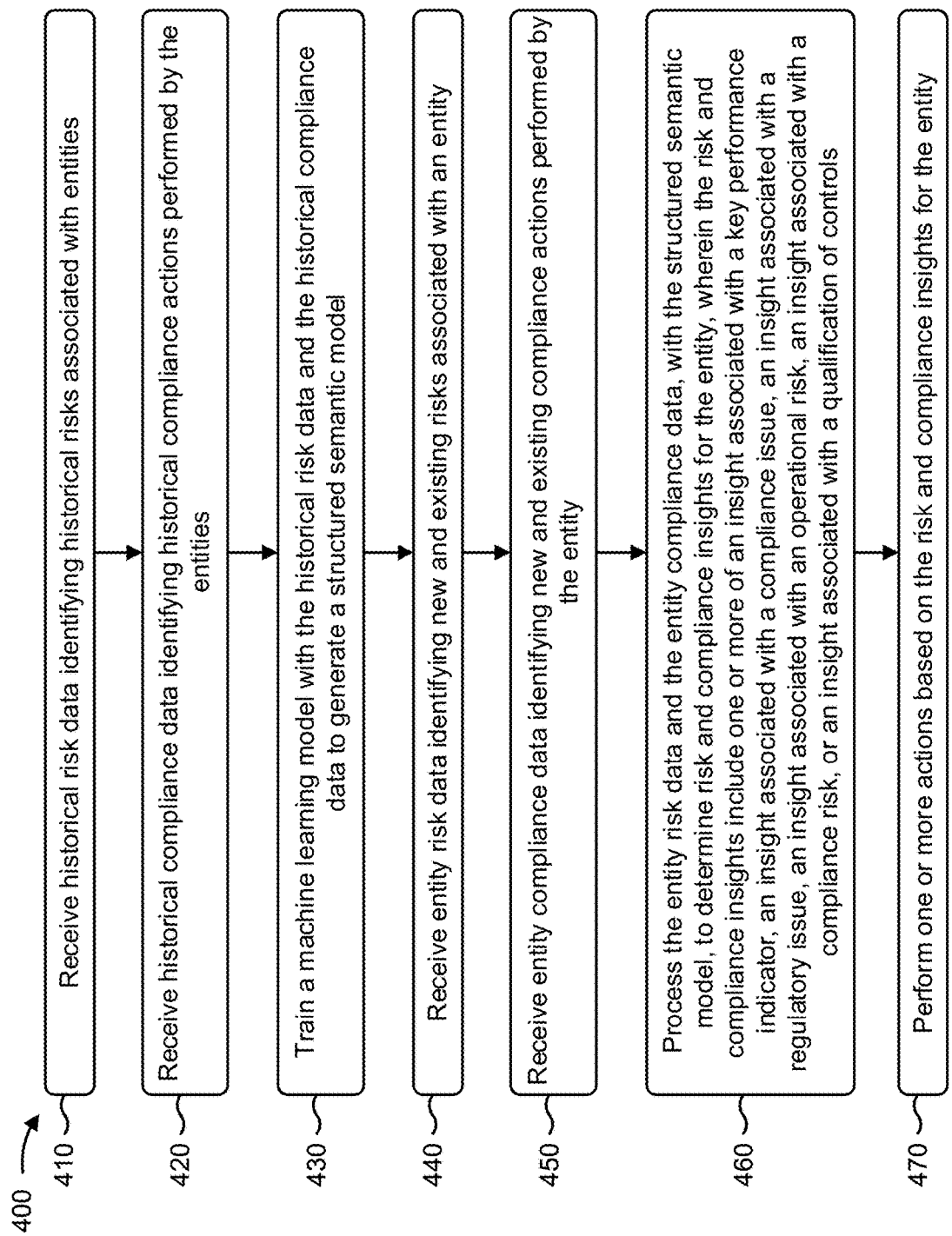
FIGS. 4-6 are flow charts of example processes for utilizing machine learning models to predict risk and compliance data, remediation incidents, and remediation solutions.

FIG. 4 is a flow chart of an example process 400 for utilizing machine learning models to predict risk and compliance data, remediation incidents, and remediation solutions. In some implementations, one or more process blocks of FIG. 4 may be performed by a device (e.g., intelligence platform 220). In some implementations, one or more process blocks of FIG. 4 may be performed by another device or a group of devices separate from or including the device, such as a client device (e.g., client device 210), a server device (e.g., server device 240), and/or the like.

As shown in FIG. 4, process 400 may include receiving historical risk data identifying historical risks associated with entities (block 410). For example, the device (e.g., using computing resource 224, processor 320, communication interface 370, and/or the like) may receive historical risk data identifying historical risks associated with entities, as described above.

As further shown in FIG. 4, process 400 may include receiving historical compliance data identifying historical compliance actions performed by the entities (block 420). For example, the device (e.g., using computing resource 224, processor 320, communication interface 370, and/or the like) may receive historical compliance data identifying historical compliance actions performed by the entities, as described above.

As further shown in FIG. 4, process 400 may include training a machine learning model with the historical risk data and the historical compliance data to generate a structured semantic model (block 430). For example, the device (e.g., using computing resource 224, processor 320, memory 330, and/or the like) may train a machine learning model with the historical risk data and the historical compliance data to generate a structured semantic model, as described above.

As further shown in FIG. 4, process 400 may include receiving entity risk data identifying new and existing risks associated with an entity (block 440). For example, the device (e.g., using computing resource 224, processor 320, communication interface 370, and/or the like) may receive entity risk data identifying new and existing risks associated with an entity, as described above.

As further shown in FIG. 4, process 400 may include receiving entity compliance data identifying new and existing compliance actions performed by the entity (block 450). For example, the device (e.g., using computing resource 224, processor 320, communication interface 370, and/or the like) may receive entity compliance data identifying new and existing compliance actions performed by the entity, as described above.

As further shown in FIG. 4, process 400 may include processing the entity risk data and the entity compliance data, with the structured semantic model, to determine risk and compliance insights for the entity, wherein the risk and compliance insights include one or more of an insight associated with a key performance indicator, an insight associated with a compliance issue, an insight associated with a regulatory issue, an insight associated with an operational risk, an insight associated with a compliance risk, or an insight associated with a qualification of controls (block 460). For example, the device (e.g., using computing resource 224, processor 320, storage component 340, and/or the like) may process the entity risk data and the entity compliance data, with the structured semantic model, to determine risk and compliance insights for the entity, as described above. In some implementations, the risk and compliance insights may include one or more of an insight associated with a key performance indicator, an insight associated with a compliance issue, an insight associated with a regulatory issue, an insight associated with an operational risk, an insight associated with a compliance risk, or an insight associated with a qualification of controls.

As further shown in FIG. 4, process 400 may include performing one or more actions based on the risk and compliance insights for the entity (block 470). For example, the device (e.g., using computing resource 224, processor 320, memory 330, storage component 340, communication interface 370, and/or the like) may perform one or more actions based on the risk and compliance insights for the entity, as described above.

Process 400 may include additional implementations, such as any single implementation or any combination of implementations described below and/or in connection with one or more other processes described elsewhere herein.

In a first implementation, performing the one or more actions may include providing, for display, data identifying the risk and compliance insights; determining operational risk and reporting analytics for the entity based on the risk and compliance insights; or determining predictions for proactive responses to the risks based on the risk and compliance insights.

In a second implementation, alone or in combination with the first implementation, performing the one or more actions may include determining a proactive data quality management plan for the entity based on the risk and compliance insights; determining an integrated action management plan for the entity based on the risk and compliance insights; causing, based on the risk and compliance insights, a particular compliance action to be performed to address a particular risk; or retraining the structured semantic model based on the risk and compliance insights.

In a third implementation, alone or in combination with one or more of the first and second implementations, the historical risks associated with the entities may include historical hazard risks associated with the entities, historical injury risks associated with the entities, historical theft risks associated with the entities, historical operational risks associated with the entities, historical financial risks associated with the entities, historical regulatory risks associated with the entities, or historical strategic risks associated with the entities.

In a fourth implementation, alone or in combination with one or more of the first through third implementations, the historical compliance actions may include historical compliance with laws by the entities, historical compliance with rules by the entities, or historical compliance with regulations by the entities.

In a fifth implementation, alone or in combination with one or more of the first through fourth implementations, performing the one or more actions may include generating a compliance report for a regulatory audit based on the risk and compliance insights for the entity, and providing the compliance report to a regulatory authority.

In a sixth implementation, alone or in combination with one or more of the first through fifth implementations, performing the one or more actions may include generating one or more notifications for a mobile application based on the risk and compliance insights for the entity, and providing the one or more notifications to a mobile application stored in a client device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
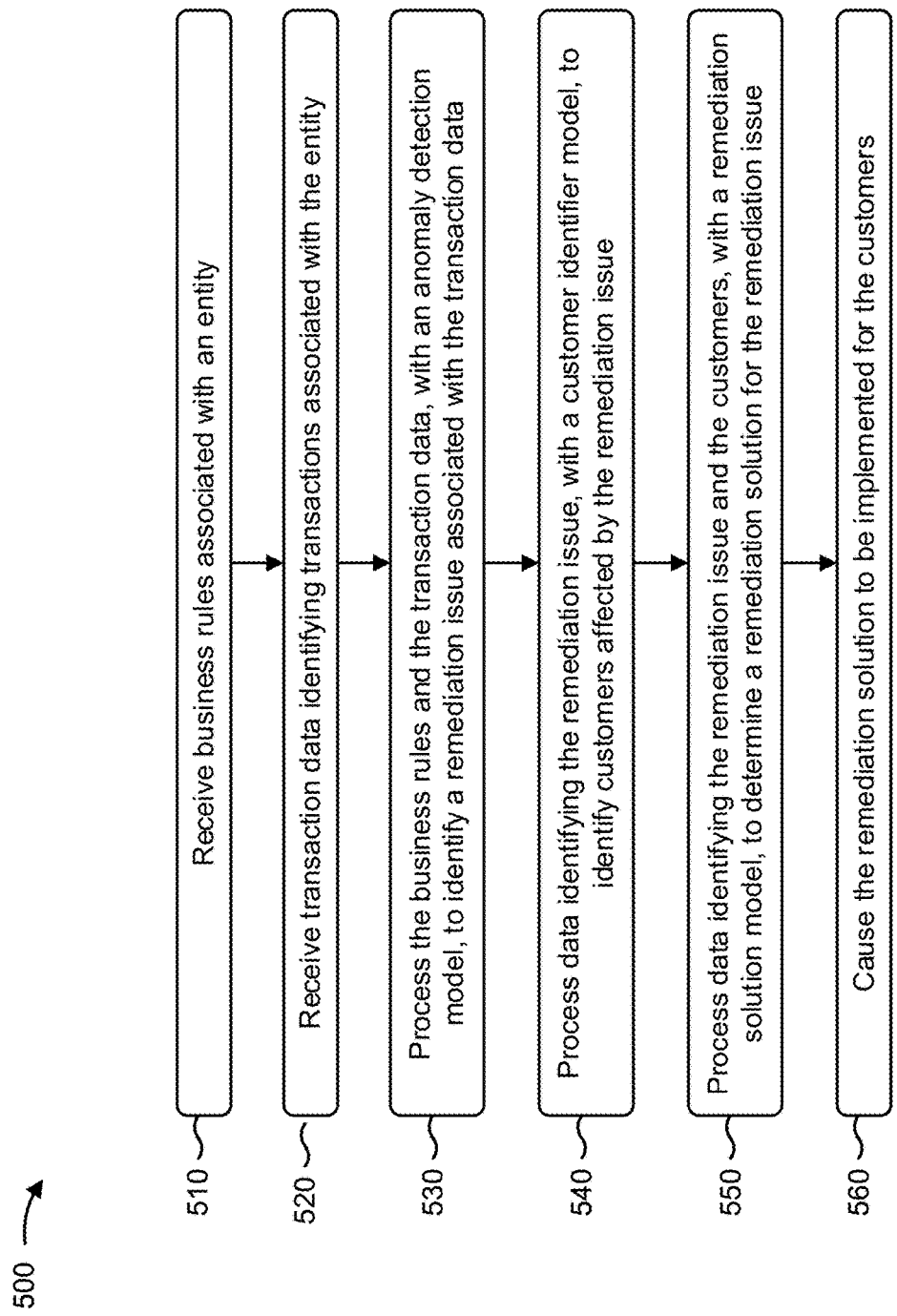

FIG. 5 is a flow chart of an example process 500 for utilizing machine learning models to predict risk and compliance data, remediation incidents, and remediation solutions. In some implementations, one or more process blocks of FIG. 5 may be performed by a device (e.g., intelligence platform 220). In some implementations, one or more process blocks of FIG. 5 may be performed by another device or a group of devices separate from or including the device, such as a client device (e.g., client device 210), a server device (e.g., server device 240), and/or the like.

As shown in FIG. 5, process 500 may include receiving business rules associated with an entity (block 510). For example, the device (e.g., using computing resource 224, processor 320, communication interface 370, and/or the like) may receive business rules associated with an entity, as described above.

As further shown in FIG. 5, process 500 may include receiving transaction data identifying transactions associated with the entity (block 520). For example, the device (e.g., using computing resource 224, processor 320, communication interface 370, and/or the like) may receive transaction data identifying transactions associated with the entity, as described above.

As further shown in FIG. 5, process 500 may include processing the business rules and the transaction data, with an anomaly detection model, to identify a remediation issue associated with the transaction data (block 530). For example, the device (e.g., using computing resource 224, processor 320, memory 330, and/or the like) may process the business rules and the transaction data, with an anomaly detection model, to identify a remediation issue associated with the transaction data, as described above.

As further shown in FIG. 5, process 500 may include processing data identifying the remediation issue, with a customer identifier model, to identify customers affected by the remediation issue (block 540). For example, the device (e.g., using computing resource 224, processor 320, storage component 340, and/or the like) may process data identifying the remediation issue, with a customer identifier model, to identify customers affected by the remediation issue, as described above.

As further shown in FIG. 5, process 500 may include processing data identifying the remediation issue and the customers, with a remediation solution model, to determine a remediation solution for the remediation issue (block 550). For example, the device (e.g., using computing resource 224, processor 320, memory 330, storage component 340, and/or the like) may process data identifying the remediation issue and the customers, with a remediation solution model, to determine a remediation solution for the remediation issue, as described above.

As further shown in FIG. 5, process 500 may include causing the remediation solution to be implemented for the customers (block 560). For example, the device (e.g., using computing resource 224, processor 320, memory 330, storage component 340, communication interface 370, and/or the like) may cause the remediation solution to be implemented for the customers, as described above.

Process 500 may include additional implementations, such as any single implementation or any combination of implementations described below and/or in connection with one or more other processes described elsewhere herein.

In a first implementation, process 500 may include processing data identifying the remediation issue, with a root cause model, to determine a root cause and a severity of the remediation issue.

In a second implementation, alone or in combination with the first implementation, causing the remediation solution to be implemented may include calculating a payment for each of the customers based on data identifying the remediation solution and the customers; generating communication channels for the customers; and causing the remediation solution to be implemented by providing the payments to the customers via corresponding ones of the communication channels.

In a third implementation, alone or in combination with one or more of the first and second implementations, receiving the business rules associated with the entity may include utilizing crawlers to retrieve documents associated with the entity, and performing optical character recognition and natural language processing on the documents to identify the business rules in the documents.

In a fourth implementation, alone or in combination with one or more of the first through third implementations, the remediation issue may include a failure of the entity to comply with a regulation, and the remediation solution may include correcting the failure of the entity to comply with the regulation.

In a fifth implementation, alone or in combination with one or more of the first through fourth implementations, process 500 may include providing a user interface that includes data identifying progress associated with implementation of the remediation solution.

In a sixth implementation, alone or in combination with one or more of the first through fifth implementations, process 500 may include causing the remediation solution to be assigned to an employee of the entity; track is progressing of the employee with regard to implementing the remediation solution; and providing a user interface that includes data identifying the progress of the employee with regard to implementing the remediation solution.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
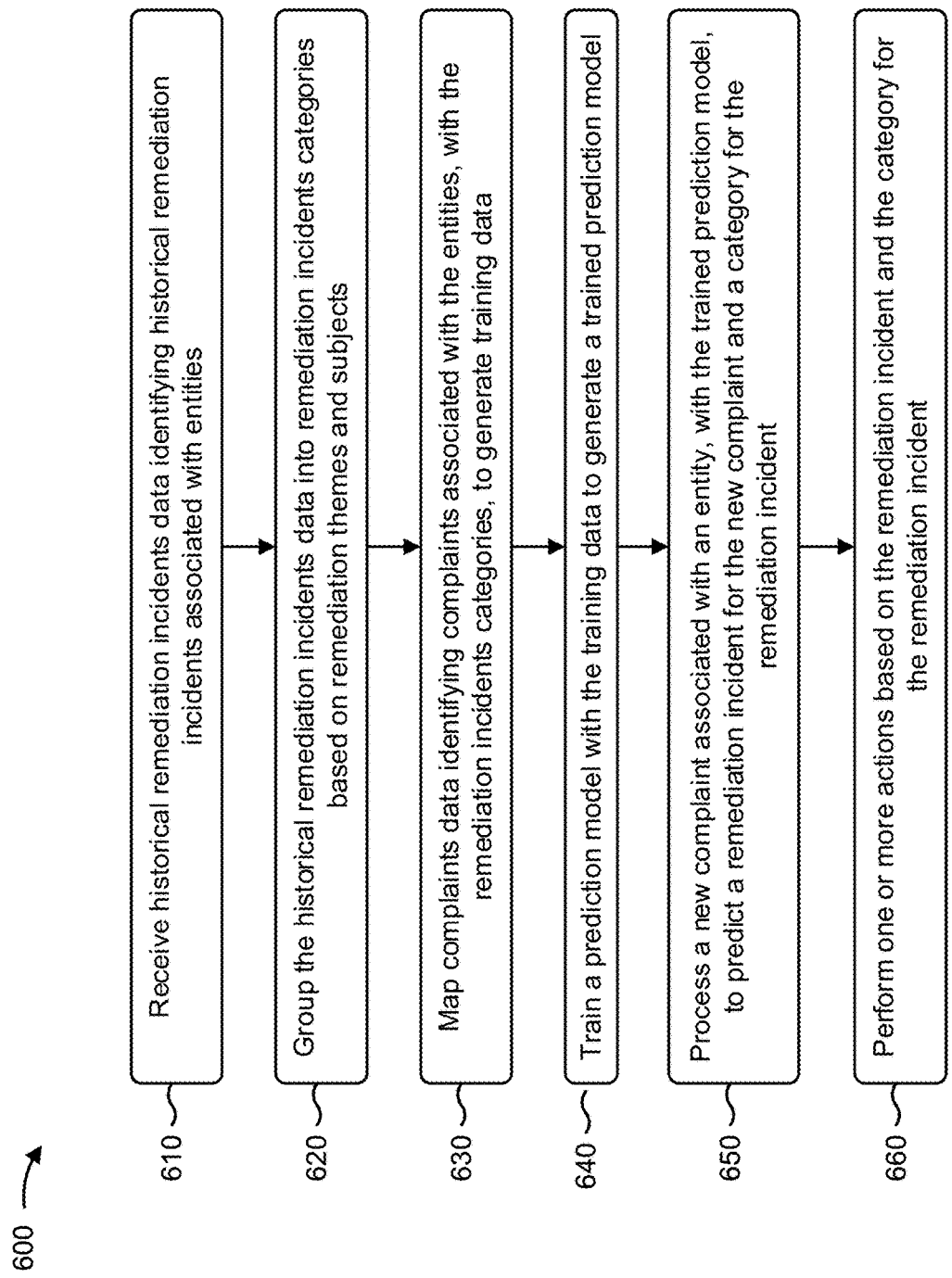

FIG. 6 is a flow chart of an example process 600 for utilizing machine learning models to predict risk and compliance data, remediation incidents, and remediation solutions. In some implementations, one or more process blocks of FIG. 6 may be performed by a device (e.g., intelligence platform 220). In some implementations, one or more process blocks of FIG. 6 may be performed by another device or a group of devices separate from or including the device, such as a client device (e.g., client device 210), a server device (e.g., server device 240), and/or the like.

As shown in FIG. 6, process 600 may include receiving historical remediation incidents data identifying historical remediation incidents associated with entities (block 610). For example, the device (e.g., using computing resource 224, processor 320, communication interface 370, and/or the like) may receive historical remediation incidents data identifying historical remediation incidents associated with entities, as described above.

As further shown in FIG. 6, process 600 may include grouping the historical remediation incidents data into remediation incidents categories based on remediation themes and subjects (block 620). For example, the device (e.g., using computing resource 224, processor 320, memory 330, and/or the like) may group the historical remediation incidents data into remediation incidents categories based on remediation themes and subjects, as described above.

As further shown in FIG. 6, process 600 may include mapping complaints data identifying complaints associated with the entities, with the remediation incidents categories, to generate training data (block 630). For example, the device (e.g., using computing resource 224, processor 320, storage component 340, and/or the like) may map complaints data identifying complaints associated with the entities, with the remediation incidents categories, to generate training data, as described above.

As further shown in FIG. 6, process 600 may include training a prediction model with the training data to generate a trained prediction model (block 640). For example, the device (e.g., using computing resource 224, processor 320, memory 330, and/or the like) may train a prediction model with the training data to generate a trained prediction model, as described above.

As further shown in FIG. 6, process 600 may include processing a new complaint associated with an entity, with the trained prediction model, to predict a remediation incident for the new complaint and a category for the remediation incident (block 650). For example, the device (e.g., using computing resource 224, processor 320, storage component 340, and/or the like) may process a new complaint associated with an entity, with the trained prediction model, to predict a remediation incident for the new complaint and a category for the remediation incident, as described above.

As further shown in FIG. 6, process 600 may include performing one or more actions based on the remediation incident and the category for the remediation incident (block 660). For example, the device (e.g., using computing resource 224, processor 320, memory 330, storage component 340, communication interface 370, and/or the like) may perform one or more actions based on the remediation incident and the category for the remediation incident, as described above.

Process 600 may include additional implementations, such as any single implementation or any combination of implementations described below and/or in connection with one or more other processes described elsewhere herein.

In a first implementation, performing the one or more actions may include providing, for display, the remediation incident and the category for the remediation incident; causing the remediation incident to become a remediation project; or determining a remediation solution for the remediation incident.

In a second implementation, alone or in combination with the first implementation, performing the one or more actions may include causing a remediation solution for the remediation incident to be implemented; determining, a customer, a customer payout, and a customer communication channel for the remediation incident; or retraining the prediction model based on the remediation incident and the category for the remediation incident.

In a third implementation, alone or in combination with one or more of the first and second implementations, process 600 may include enriching the remediation incident categories with historical remediation project data prior to mapping the complaints data with the remediation incidents categories.

In a fourth implementation, alone or in combination with one or more of the first through third implementations, process 600 may include processing another new complaint associated with the entity, with the trained prediction model, to predict a minimal financial impact associated with the other new complaint; and classifying the other new complaint as a non-remediation incident based on the minimal financial impact associated with the other new complaint.

In a fifth implementation, alone or in combination with one or more of the first through fourth implementations, process 600 may include processing another new complaint associated with the entity, with the trained prediction model, to predict a non-remediation incident associated with the other new complaint; and classifying the other new complaint as the non-remediation incident.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, historical risk data identifying historical risks associated with entities;
receiving, by the device, historical compliance data identifying historical compliance actions performed by the entities,
wherein the historical compliance data identifies historical compliance laws or rules by the entities and laws, rules, or regulations that are enforced by one or more governmental agencies;
selecting, by the device, one or more data pre-processing techniques, from a set of data pre-processing techniques, based on at least one of:
a type associated with the historical risk data,
a type associated with the historical compliance data,
a source of the historical risk data,
a source of the historical compliance data,
a format of the historical risk data, or
a format of the historical compliance data;
pre-processing, by the device and using the selected one or more data pre-processing techniques, the historical risk data and the historical compliance data to convert the historical risk data and the historical compliance data into a predetermined format,
wherein pre-processing the historical risk data and the historical compliance data comprises:
detecting corrupt records from the historical risk data and the historical compliance data;
performing, by the device and after conversion of the historical risk data and the historical compliance data into the predetermined format, natural language processing on the historical risk data and the historical compliance data;
processing, by the device, the historical risk data and the historical compliance data to separate the historical risk data and the historical compliance data into a training set, a validation set, and a test set;
training, by the device and based on a result of the natural language processing, a machine learning model with the historical risk data and the historical compliance data to generate a structured sematic model,
wherein the structured semantic model is trained based on a latent sematic indexing technique to generate semantic information associated with the one or more governmental agencies;
receiving, by the device, entity risk data identifying new and existing risk associated with an entity;
receiving, by the device, entity compliance data identifying new and existing compliance actions performed by the entity;
processing, by the device, the entity risk data and the entity compliance data, with the structured semantic model, to determine risk compliance insights for the entity,
wherein the risk and compliance insights include one or more of:
an insight associated with data quality issues associated with the entity risk data or the entity compliance data,
an insight associated with a key performance indicator, an insight associated with a compliance issue,
an insight associated with a regulator issue,
an insight associated with an operational risk
an insight associated with a compliance risk, or
an insight associated with a qualification of controls;
and
performing, by the device, one or more actions based on the risk and compliance insights for the entity, wherein performing the one or more actions comprises:
retraining the structured semantic model based on the risk and compliance insights,
providing, for display, a user interface, wherein the user interface comprises an interactive application that processes input using one or more artificial intelligence methods to obtain information associated with the risk and compliance insights; and
determining a proactive data quality management plan for the entity based on the risk and compliance insights.

2. The method of claim 1, wherein performing the one or more actions comprises one or more of:
providing, for display, data identifying the risk and compliance insights;
determining operational risk and reporting analytics for the entity based on the risk and compliance insights; or
determining predictions for proactive responses to the risks based on the risk and compliance insights.

3. The method of claim 1, wherein performing the one or more actions further comprises one or more of:
determining an integrated action management plan for the entity based on the risk and compliance insights; or
causing, based on the risk and compliance insights, a particular compliance action to be performed to address a particular risk.

4. The method of claim 1, wherein the historical risks associated with the entities include one or more of:
historical hazard risks associated with the entities,
historical injury risks associated with the entities,
historical theft risks associated with the entities,
historical operational risks associated with the entities,
historical financial risks associated with the entities,
historical regulatory risks associated with the entities, or
historical strategic risks associated with the entities.

5. The method of claim 1, wherein the historical compliance actions include one or more of:
historical compliance with laws by the entities,
historical compliance with rules by the entities, or
historical compliance with regulations by the entities.

6. The method of claim 1, wherein performing the one or more actions comprises:
generating a compliance report for a regulatory audit based on the risk and compliance insights for the entity; and
providing the compliance report to a regulatory authority.

7. The method of claim 1, wherein performing the one or more actions comprises:
generating one or more notifications for a mobile application based on the risk and compliance insights for the entity; and
providing the one or more notifications to the mobile application stored in a client device.

8. A device, comprising:
one or more memories; and
one or more processors, communicatively coupled to the one or more memories, configured to:
receive historical business data identifying historical business rules associated with entities and laws, rules, or regulations that are enforced by one or more governmental agencies;
receive historical transaction data identifying historical transactions involving the entities;
selected one or more data pre-processing techniques, from a set of data pre-processing techniques, based on at least one of:
a type associated with the historical business data,
a type associated with the historical transaction data,
a source of the historical business data,
a source of the historical transaction data,
a format of the historical business data, or
a format of the historical transaction data;
pre-processing, using the selected one or more data pre-processing techniques, the historical business data and the historical transaction data to convert the historical business data and the historical transaction data into a predetermined format,
wherein the one or more processors, when pre-processing the historical business data and the historical transaction data, are to:
detect corrupt records from the historical business data and the historical transaction data;
perform, after conversion of the historical business data and the historical transaction data into the predetermined format, natural language processing on the historical business data and the historical transaction data;
process the historical business data and the historical transaction data to separate the historical business data and the historical transaction data into a training set, a validation set, and a test set;
train, based on a result of the natural language processing, a machine learning model with the training set to generate an anomaly detection model,
wherein the anomaly detection model is trained based on a latent semantic indexing technique to generate semantic information associated with the one or more governmental agencies;
receive business rules associated with an entity;
receive transaction data identifying transactions associated with the entity;
process the business rules and the transaction data, with the anomaly detection model, to identify a remediation issue associated with the transaction data;
process data identifying the remediation issue, with a customer identifier model, to identify customers affected by the remediation issue;
process data identifying the remediation issue with the customers, with a remediation solution model, to determine a remediation solution for the remediation issue;
provide, for display, a user interface,
wherein the user interface comprises an interactive application that processes input using one or more artificial intelligence methods to obtain information associated with the remediation solution;
cause the remediation solution to be implemented for the customers; and
retrain the remediation solution model based on a result of the remediation solution.

9. The device of claim 8, wherein the one or more processors are further configured to:

process data identifying the remediation issue, with a root cause model, to determine a root cause and a severity of the remediation issue.

10. The device of claim 8, wherein the one or more processors, when causing the remediation solution to be implemented, are configured to:
calculate a payment for each of the customers based on data identifying the remediation solution and the customers;
generate communication channels for the customers; and
cause the remediation solution to be implemented by providing the payments to the customers via corresponding ones of the communication channels.

11. The device of claim 8, wherein the one or more processors, when receiving the business rules associated with the entity, are configured to:
utilize crawlers to retrieve documents associated with the entity; and
perform optical character recognition and natural language processing on the documents to identify the business rules in the documents.

12. The device of claim 8, wherein:
the remediation issue includes a failure of the entity to comply with a regulation, and
the remediation solution includes correcting the failure of the entity to comply with the regulation.

13. The device of claim 8, wherein the one or more processors are further configured to:
provide another user interface that includes data identifying progress associated with implementation of the remediation solution.

14. The device of claim 8, wherein the one or more processors, when causing the remediation solution to be implemented, are configured to:
cause the remediation solution to be assigned to an employee of the entity;
track progress of the employee with regard to implementing the remediation solution; and
provide another user interface that includes data identifying the progress of the employee with regard to implementing the remediation solution.

15. A non-transitory computer-readable medium storing instructions, the instructions comprising:
one or more instructions that, when executed by one or more processors, cause the one or ore processors to:
receive historical remediation incidents data identifying historical remediation incidents associated with entities and laws, rules, or regulations that are enforced by one or more governmental agencies;
selected one or more data pre-processing techniques, from a set of data pre-processing techniques, based on at least one of:
a type associated with the historical remediation incidents data,
a source of the historical remediation incidents data, or
a format of the historical remediation incidents data;
pre-processing, using the selected one or more data pre-processing techniques, the remediation incidents data to convert the remediation incidents data into a predetermined format,
wherein the one or more instructions, that cause the one or more processors to pre-process the historical remediation incidents data, cause the one or more processors to:
detect corrupt records from the historical remediation incidents data;
perform, after conversion of the remediation incidents data into the predetermined format, natural language processing on the remediation incidents data;
group the historical remediation incidents data, after performing the natural language processing, into remediation incidents categories based on remediation themes and subjects;
map complaints data identifying complaints associated with the entities, with the remediation incidents categories, to generate training data, validation data, and test data;
train a prediction model with the training data to generate a trained prediction model,
wherein the prediction model is trained based on a latent semantic indexing technique to generate semantic information associated with the one or more governmental agencies;
process a new complaint associated with an entity, with the trained prediction model, to predict a remediation incident for the new complaint and a category for the remediation incident; and
perform one or more actions based on the remediation incident and the category for the remediation incident, wherein the one or more instructions, that cause the one or more processors to perform the one or more actions, cause the one or more processors to:
retrain the trained prediction model based on the remediation incident and the category for the remediation incident.

16. The non-transitory computer-readable medium of claim 15, wherein the one or more instructions, that cause the one or more processors to perform the one or more actions, cause the one or more processors to one or more of:
provide, for display, the remediation incident and the category for the remediation incident;
cause the remediation incident to become a remediation project; or
determine a remediation solution for the remediation incident.

17. The non-transitory computer-readable medium of claim 15, wherein the one or more instructions, that cause the one or more processors to perform the one or more actions, further cause the one or more processors to one or more of:
cause a remediation solution for the remediation incident to be implemented; or
determine, a customer, a customer payout, and a customer communication channel for the remediation incident.

18. The non-transitory computer-readable medium of claim 15, wherein the instructions further comprise:
one or more instructions that, when executed by the one or more processors, cause the one or more processors to:
enrich the remediation incident categories with historical remediation project data prior to mapping the complaints data with the remediation incidents categories.

19. The non-transitory computer-readable medium of claim 15, wherein the instructions further comprise:
one or more instructions that, when executed by the one or more processors, cause the one or more processors to:
process another new complaint associated with the entity, with the trained prediction model, to predict a financial impact associated with the other new complaint; and classify the other new complaint as a non-remediation incident based on the financial impact associated with the other new complaint.

20. The non-transitory computer-readable medium of claim 15, wherein the instructions further comprise:
one or more instructions that, when executed by the one or more processors, cause the one or more processors to:
process another new complaint associated with the entity, with the trained prediction model, to predict a non-remediation incident associated with the other new complaint; and
classify the other new complaint as the non-remediation incident.

\* \* \* \* \*

UNITED STATES PATENT AND TRADEMARK OFFICE
CERTIFICATE OF CORRECTION

PATENT NO. : 11,580,475 B2
APPLICATION NO. : 16/720121
DATED : February 14, 2023
INVENTOR(S) : San Retna et al.

It is certified that error appears in the above-identified patent and that said Letters Patent is hereby corrected as shown below:

In the Claims

Please correct Claim 1 as follows:
Column 28, Lines 13-14, change "wherein the historical compliance data identifies historical compliance laws or rules by the entities and" to --wherein the historical compliance data identifies historical compliance with laws or rules by the entities and--

Column 28, Lines 47-49, change "data to generate a structured sematic model, wherein the structured semantic model is trained based on a latent sematic indexing technique to generate" to --data to generate a structured semantic model, wherein the structured semantic model is trained based on a latent semantic indexing technique to generate--

Column 28, Line 53, change "and existing risk associated with an entity;" to --and existing risks associated with an entity;--

Column 28, Line 59, change "model, to determine risk compliance insights for the" to --model, to determine risk and compliance insights for the--

Column 29, Line 2, change "an insight associated with a regulator issue," to --an insight associated with a regulatory issue,--

Please correct Claim 8 as follows:
Column 30, Line 7, change "selected one or more data pre-processing techniques," to --select one or more data pre-processing techniques,--

Column 30, Line 50, change "pre-processing, using the selected one or more data" to --pre-process, using the selected one or more data--

Column 30, Line 53, change "process data identifying the remediation issue with the" to --process data identifying the remediation issue and the--

Signed and Sealed this
Twenty-eighth Day of March, 2023

Katherine Kelly Vidal
*Director of the United States Patent and Trademark Office*

CERTIFICATE OF CORRECTION (continued)
U.S. Pat. No. 11,580,475 B2

Please correct Claim 15 as follows:
Column 31, Line 50, change "selected one or more data pre-processing techniques," to --select one or more data pre-processing techniques,--

Column 31, Line 58, change "pre-processing, using the selected one or more data" to --pre-process, using the selected one or more data--